US012579729B2

(12) United States Patent
Chupeau et al.

(10) Patent No.: US 12,579,729 B2
(45) Date of Patent: Mar. 17, 2026

(54) VOLUMETRIC VIDEO SUPPORTING LIGHT EFFECTS

(71) Applicant: InterDigital CE Patent Holdings, SAS, Paris (FR)

(72) Inventors: Bertrand Chupeau, Rennes (FR); Renaud Dore, Rennes (FR); Julien Fleureau, Rennes (FR); Franck Thudor, Rennes (FR)

(73) Assignee: InterDigital CE Patent Holdings, SAS, Paris (FR)

( * ) Notice: Subject to any disclaimer, the term of this patent is extended or adjusted under 35 U.S.C. 154(b) by 248 days.

(21) Appl. No.: 18/285,608

(22) PCT Filed: Apr. 4, 2022

(86) PCT No.: PCT/EP2022/058896
§ 371 (c)(1),
(2) Date: Oct. 4, 2023

(87) PCT Pub. No.: WO2022/214435
PCT Pub. Date: Oct. 13, 2022

(65) Prior Publication Data
US 2024/0249462 A1    Jul. 25, 2024

(30) Foreign Application Priority Data

Apr. 7, 2021    (EP) .................................... 21305440

(51) Int. Cl.
*G06T 15/06*      (2011.01)
*G06T 7/50*       (2017.01)
(Continued)

(52) U.S. Cl.
CPC ............... *G06T 15/06* (2013.01); *G06T 7/50* (2017.01); *G06T 7/90* (2017.01); *G06V 10/56* (2022.01);
(Continued)

(58) Field of Classification Search
CPC .. G06T 15/06; G06T 7/50; G06T 7/90; G06T 2207/10024; G06T 15/04; H04N 19/597;
(Continued)

(56) References Cited

U.S. PATENT DOCUMENTS 5,396,583 A * 3/1995 Chen ....................... G06T 15/04
                                                            345/427
5,446,833 A * 8/1995 Miller ..................... G06T 15/04
                                                            345/585
(Continued)

FOREIGN PATENT DOCUMENTS

EP          3349182 A1 * 7/2018  ............... G06T 7/50
WO    WO 2020232281 A1   11/2020
(Continued)

OTHER PUBLICATIONS

Heidrich, Wolfgang. "Environment Maps and Their Applications." Max-Planck-Institute for Computer Science, Saarbrücken, Germany 19.4 (2000). (Year: 2000).*
(Continued)

*Primary Examiner* — Charles L Beard
(74) *Attorney, Agent, or Firm* — Condo Roccia Koptiw LLP

(57) ABSTRACT

Methods, devices and data streams are proposed to encode, transport and decode 3D volumetric videos. The embodiments encompass the signaling of non-Lambertian patches together with their light reflection properties, so as to enable a ray-tracing based rendering engine to synthesize visually realistic virtual views with respect to light effects. A retro-compatible solution enabling conventional rendering engines to render such described 3D scene but without the advanced light effects is also described.

22 Claims, 8 Drawing Sheets

(51) Int. Cl.
| | | |
|---|---|---|
| *G06T 7/90* | (2017.01) |
| *G06V 10/56* | (2022.01) |
| *H04N 13/351* | (2018.01) |
| *H04N 19/597* | (2014.01) |

(52) U.S. Cl.
CPC ......... *H04N 13/351* (2018.05); *H04N 19/597* (2014.11); *G06T 2207/10024* (2013.01)

(58) Field of Classification Search
CPC .... H04N 13/351; H04N 19/23; H04N 13/111; G06V 10/56
See application file for complete search history.

(56) References Cited

U.S. PATENT DOCUMENTS

| | | | | |
|---|---|---|---|---|
| 5,704,024 A * | 12/1997 | Voorhies | G06T 15/506 | 345/426 |
| 6,034,691 A * | 3/2000 | Aono | G06T 15/10 | 345/620 |
| 6,384,824 B1 * | 5/2002 | Morgan | G06T 15/50 | 345/426 |
| 6,486,908 B1 * | 11/2002 | Chen | G06T 7/32 | 345/441 |
| 6,559,853 B1 * | 5/2003 | Hashimoto | G06T 15/04 | 345/585 |
| 6,668,078 B1 * | 12/2003 | Bolle | G06T 7/174 | 356/240.1 |
| 6,697,062 B1 * | 2/2004 | Cabral | G06T 15/205 | 345/646 |
| 6,750,873 B1 * | 6/2004 | Bernardini | G06T 7/55 | 345/581 |
| 6,975,319 B1 * | 12/2005 | Donovan | G06T 15/04 | 345/428 |
| 6,999,080 B1 * | 2/2006 | Ungar | G06T 15/506 | 345/426 |
| 7,884,830 B1 * | 2/2011 | Green | G06T 15/04 | 345/623 |
| 10,242,484 B1 * | 3/2019 | Cernigliaro | G06T 9/008 | |
| 10,460,501 B2 * | 10/2019 | Wallner | G06T 15/205 | |
| 10,559,121 B1 * | 2/2020 | Moudgil | G06T 15/50 | |
| 10,699,444 B2 * | 6/2020 | Mammou | G06T 7/50 | |
| 10,777,010 B1 * | 9/2020 | Patel | G06T 15/50 | |
| 10,897,269 B2 * | 1/2021 | Mammou | H03M 7/30 | |
| 10,909,727 B2 * | 2/2021 | Mammou | G06T 9/001 | |
| 11,113,845 B2 * | 9/2021 | Tourapis | G06T 3/08 | |
| 11,659,151 B2 * | 5/2023 | Aflaki | G06T 7/41 | 345/419 |
| 11,721,064 B1 * | 8/2023 | Aksoy | G06N 20/00 | 345/418 |
| 11,972,536 B1 * | 4/2024 | Rong | G06T 19/20 | |
| 12,137,255 B2 * | 11/2024 | Tian | H04N 19/91 | |
| 12,159,345 B2 * | 12/2024 | Fialko | G06T 17/00 | |
| 12,160,557 B2 * | 12/2024 | Sundram | F21V 33/0052 | |
| 12,182,960 B1 * | 12/2024 | Rong | G06V 20/52 | |
| 12,363,343 B2 * | 7/2025 | Tourapis | H04N 19/597 | |
| 2002/0126129 A1 * | 9/2002 | Snyder | G06T 15/04 | 345/582 |
| 2003/0091226 A1 * | 5/2003 | Cahill | G06V 20/64 | 382/154 |
| 2003/0231173 A1 * | 12/2003 | Matusik | G06T 17/20 | 345/419 |
| 2003/0231174 A1 * | 12/2003 | Matusik | G06T 15/506 | 345/419 |
| 2003/0231175 A1 * | 12/2003 | Pfister | G06T 15/205 | 345/419 |
| 2004/0227766 A1 * | 11/2004 | Chou | G06T 15/04 | 345/582 |
| 2006/0028474 A1 * | 2/2006 | Pfister | G06T 13/20 | 345/473 |
| 2006/0087514 A1 * | 4/2006 | Ungar | G06T 15/506 | 345/582 |
| 2006/0170695 A1 * | 8/2006 | Zhou | G06T 17/20 | 345/582 |

| | | | | |
|---|---|---|---|---|
| 2008/0122836 A1 * | 5/2008 | Van Horn | G06T 15/04 | 345/419 |
| 2009/0021522 A1 * | 1/2009 | Burley | G06T 15/04 | 345/582 |
| 2010/0245355 A1 * | 9/2010 | Chang | G06T 7/74 | 345/426 |
| 2010/0296724 A1 * | 11/2010 | Chang | G06V 20/647 | 382/154 |
| 2011/0273528 A1 * | 11/2011 | Sazawa | G06T 15/20 | 348/E7.001 |
| 2012/0256923 A1 * | 10/2012 | Gautron | G06T 15/50 | 345/426 |
| 2013/0016112 A1 * | 1/2013 | Burley | G06T 15/04 | 345/582 |
| 2016/0034137 A1 * | 2/2016 | Foster | G06F 3/04886 | 715/788 |
| 2017/0301132 A1 * | 10/2017 | Dalton | G06T 15/40 | |
| 2018/0047208 A1 * | 2/2018 | Marin | H04N 13/257 | |
| 2018/0075641 A1 * | 3/2018 | Ceylan | G06T 15/04 | |
| 2018/0101978 A1 * | 4/2018 | Hirota | G06T 5/77 | |
| 2018/0234669 A1 * | 8/2018 | Chen | H04N 13/373 | |
| 2018/0247393 A1 * | 8/2018 | Ohga | H04N 23/698 | |
| 2019/0020903 A1 * | 1/2019 | Taylor, II | G06T 5/70 | |
| 2019/0052858 A1 * | 2/2019 | Yip | H04N 13/161 | |
| 2019/0057487 A1 * | 2/2019 | Cheng | H04N 13/161 | |
| 2019/0081638 A1 * | 3/2019 | Mammou | H04N 19/436 | |
| 2019/0087978 A1 * | 3/2019 | Tourapis | G06T 3/08 | |
| 2019/0087979 A1 * | 3/2019 | Mammou | H04N 19/597 | |
| 2019/0108655 A1 * | 4/2019 | Lasserre | G06T 15/04 | |
| 2019/0188828 A1 * | 6/2019 | Aggarwal | G06T 15/20 | |
| 2019/0200096 A1 * | 6/2019 | Katsumata | H04N 21/26258 | |
| 2019/0228568 A1 * | 7/2019 | Wu | G06T 15/506 | |
| 2019/0260989 A1 * | 8/2019 | Racape | H04N 19/51 | |
| 2019/0313110 A1 * | 10/2019 | Mammou | G06T 7/248 | |
| 2019/0362539 A1 * | 11/2019 | Kurz | G06T 7/40 | |
| 2020/0013235 A1 * | 1/2020 | Tsai | H04N 19/597 | |
| 2020/0020132 A1 * | 1/2020 | Sinharoy | H03M 7/70 | |
| 2020/0029063 A1 * | 1/2020 | Briggs | H04N 13/128 | |
| 2020/0053393 A1 * | 2/2020 | Niamut | H04N 19/597 | |
| 2020/0105024 A1 * | 4/2020 | Mammou | G06T 9/001 | |
| 2020/0111237 A1 * | 4/2020 | Tourapis | G06T 9/001 | |
| 2020/0118253 A1 * | 4/2020 | Eisenmann | G06T 15/04 | |
| 2020/0153885 A1 * | 5/2020 | Lee | G06T 15/005 | |
| 2020/0154137 A1 * | 5/2020 | Fleureau | H04N 19/172 | |
| 2020/0177916 A1 * | 6/2020 | Niamut | H04N 19/46 | |
| 2020/0177939 A1 * | 6/2020 | Swaminathan | H04N 21/2662 | |
| 2020/0219286 A1 * | 7/2020 | Sinharoy | G06T 7/174 | |
| 2020/0228777 A1 * | 7/2020 | Dore | H04N 13/122 | |
| 2020/0265611 A1 * | 8/2020 | Hemmer | G06T 9/001 | |
| 2020/0294271 A1 * | 9/2020 | Ilola | G06T 17/20 | |
| 2020/0314449 A1 * | 10/2020 | Fleureau | H04N 19/20 | |
| 2020/0344493 A1 * | 10/2020 | Fleureau | H04N 13/178 | |
| 2020/0363202 A1 * | 11/2020 | Metzler | G06T 7/80 | |
| 2020/0374559 A1 * | 11/2020 | Fleureau | G06T 9/00 | |
| 2020/0380765 A1 * | 12/2020 | Thudor | H04N 19/597 | |
| 2020/0396471 A1 * | 12/2020 | Wang | G06T 9/001 | |
| 2021/0006833 A1 * | 1/2021 | Tourapis | G06T 9/001 | |
| 2021/0006834 A1 * | 1/2021 | Salahieh | H04N 19/597 | |
| 2021/0021664 A1 | 1/2021 | Oyman | | |
| 2021/0049828 A1 * | 2/2021 | Park | H04N 19/30 | |
| 2021/0074025 A1 * | 3/2021 | Fleureau | H04N 13/161 | |
| 2021/0074029 A1 * | 3/2021 | Fleureau | G06T 9/00 | |
| 2021/0092345 A1 * | 3/2021 | Graziosi | H04N 13/161 | |
| 2021/0105313 A1 * | 4/2021 | Wang | H04L 65/70 | |
| 2021/0112236 A1 * | 4/2021 | Fleureau | H04N 21/84 | |
| 2021/0176496 A1 * | 6/2021 | Chupeau | G06T 7/529 | |
| 2021/0195162 A1 * | 6/2021 | Chupeau | H04N 21/816 | |
| 2021/0217200 A1 * | 7/2021 | Oh | G06T 17/00 | |
| 2021/0233303 A1 * | 7/2021 | Takahashi | G06T 9/00 | |
| 2021/0258590 A1 * | 8/2021 | Boyce | H04N 19/39 | |
| 2021/0274146 A1 * | 9/2021 | Oh | H04N 13/194 | |
| 2021/0274147 A1 * | 9/2021 | Fleureau | H04N 13/117 | |
| 2021/0304444 A1 * | 9/2021 | Zhang | H04N 19/88 | |
| 2021/0337237 A1 * | 10/2021 | Zakharchenko | G06T 9/001 | |
| 2021/0337243 A1 * | 10/2021 | Oh | H04N 19/597 | |
| 2021/0383122 A1 * | 12/2021 | Jeong | G06F 18/25 | |
| 2021/0407139 A1 * | 12/2021 | Graziosi | H04N 19/119 | |
| 2021/0409768 A1 * | 12/2021 | Joshi | H04N 19/136 | |

(56) References Cited

U.S. PATENT DOCUMENTS

| | | | |
|---|---|---|---|
| 2022/0007000 A1* | 1/2022 | Lee | H04N 19/597 |
| 2022/0060529 A1* | 2/2022 | Oh | H04N 13/194 |
| 2022/0078486 A1* | 3/2022 | Hannuksela | H04N 21/4728 |
| 2022/0094909 A1* | 3/2022 | Hannuksela | H04N 19/172 |
| 2022/0094980 A1* | 3/2022 | Joshi | H04N 19/167 |
| 2022/0124359 A1* | 4/2022 | Wang | H04N 19/102 |
| 2022/0159231 A1* | 5/2022 | Chupeau | G06T 15/20 |
| 2022/0164994 A1* | 5/2022 | Joshi | G06T 9/001 |
| 2022/0167015 A1* | 5/2022 | Fleureau | G06T 17/00 |
| 2022/0191544 A1* | 6/2022 | Schwarz | H04N 19/70 |
| 2022/0232234 A1* | 7/2022 | Zakharchenko | G06T 9/001 |
| 2022/0232261 A1* | 7/2022 | Zakharchenko | H04N 19/597 |
| 2022/0247991 A1* | 8/2022 | Takahashi | H04N 21/85406 |
| 2022/0256131 A1* | 8/2022 | Oh | H04N 21/6587 |
| 2022/0292763 A1* | 9/2022 | Ilola | G06T 15/04 |
| 2022/0343545 A1* | 10/2022 | Ryu | H04N 19/30 |
| 2022/0343546 A1* | 10/2022 | Danieau | H04N 19/70 |
| 2022/0343547 A1* | 10/2022 | Moguillansky | H04N 19/597 |
| 2022/0345742 A1* | 10/2022 | Jeong | H04N 19/105 |
| 2022/0353532 A1* | 11/2022 | Zakharchenko | H04N 19/132 |
| 2022/0368879 A1* | 11/2022 | Fleureau | H04N 19/182 |
| 2023/0007338 A1* | 1/2023 | Travert | H04N 21/85406 |
| 2023/0011027 A1* | 1/2023 | Lee | H04N 13/111 |
| 2023/0028507 A1* | 1/2023 | Joshi | G06T 5/70 |
| 2023/0050860 A1* | 2/2023 | Ilola | H04N 19/597 |
| 2023/0059516 A1* | 2/2023 | Schwarz | H04N 19/179 |
| 2023/0074762 A1* | 3/2023 | Huang | G06T 17/20 |
| 2023/0093097 A1* | 3/2023 | Nolan | G06T 17/00 382/154 |
| 2023/0124419 A1* | 4/2023 | Jeong | G06T 9/00 382/232 |
| 2023/0143601 A1* | 5/2023 | Salmon-Legagneur | H04N 19/597 375/240.12 |
| 2023/0162403 A1* | 5/2023 | Tian | G06T 9/001 |
| 2023/0162404 A1* | 5/2023 | Tian | G06T 9/00 345/420 |
| 2023/0171427 A1* | 6/2023 | Bachhuber | H04N 19/177 375/240.12 |
| 2023/0215080 A1* | 7/2023 | Le Roux | G06T 17/20 345/418 |
| 2023/0217006 A1* | 7/2023 | Chupeau | H04N 13/161 345/419 |
| 2023/0217041 A1* | 7/2023 | Kim | H04N 19/70 375/240.26 |
| 2023/0224501 A1* | 7/2023 | Chupeau | H04N 21/2353 375/240.08 |
| 2023/0230285 A1* | 7/2023 | Jeong | G06T 7/40 382/232 |
| 2023/0239451 A1* | 7/2023 | Fleureau | G06V 20/647 348/43 |
| 2023/0290063 A1* | 9/2023 | Mammou | G06T 17/20 |
| 2023/0298217 A1* | 9/2023 | Rondao Alface | H04N 21/816 382/232 |
| 2023/0306644 A1* | 9/2023 | Graziosi | G06T 9/001 |
| 2023/0306646 A1* | 9/2023 | Martemianov | G06T 9/001 |
| 2023/0319248 A1* | 10/2023 | Lee | H04N 13/194 345/419 |
| 2023/0353770 A1* | 11/2023 | Kang | H04N 19/70 |
| 2023/0360170 A1* | 11/2023 | Karimi Dastjerdi | G06V 10/776 |
| 2023/0362409 A1* | 11/2023 | Chupeau | H04N 19/70 |
| 2023/0386090 A1* | 11/2023 | Shin | G06T 9/001 |
| 2023/0388542 A1* | 11/2023 | Houdaille | H04N 19/70 |
| 2023/0401755 A1* | 12/2023 | Mammou | G06T 9/001 |
| 2023/0419557 A1* | 12/2023 | Yoon | H04N 19/70 |
| 2024/0022765 A1* | 1/2024 | Tourapis | H04N 19/159 |
| 2024/0078747 A1* | 3/2024 | Yun | G06V 10/25 |
| 2024/0107076 A1* | 3/2024 | Takada | H04N 19/174 |
| 2024/0127489 A1* | 4/2024 | Graziosi | H04N 19/70 |
| 2024/0127537 A1* | 4/2024 | Graziosi | G06T 15/10 |
| 2024/0129485 A1* | 4/2024 | Malamal Vadakital | H04N 19/132 |
| 2024/0153147 A1* | 5/2024 | Graziosi | H04N 19/597 |
| 2024/0153150 A1* | 5/2024 | Kim | H04N 19/597 |
| 2024/0171775 A1* | 5/2024 | Su | H04N 19/20 |
| 2024/0193857 A1* | 6/2024 | Chupeau | G06T 17/00 |
| 2024/0196011 A1* | 6/2024 | Drazic | H04N 21/234327 |
| 2024/0236312 A1* | 7/2024 | Takada | H04N 19/40 |
| 2024/0244259 A1* | 7/2024 | Doyen | G03H 1/08 |
| 2024/0265638 A1* | 8/2024 | Hayashi | H04N 19/597 |
| 2024/0346701 A1* | 10/2024 | Kuma | G06T 17/20 |
| 2024/0380926 A1* | 11/2024 | Ikai | H04N 19/42 |
| 2024/0388729 A1* | 11/2024 | Yu | H04N 19/70 |
| 2024/0388809 A1* | 11/2024 | Wu | H04N 5/2624 |
| 2024/0404200 A1* | 12/2024 | Graziosi | G06T 15/04 |
| 2024/0406440 A1* | 12/2024 | Schwarz | H04N 19/46 |
| 2024/0420378 A1* | 12/2024 | Takada | G06T 9/002 |
| 2024/0430479 A1* | 12/2024 | Hayashi | G06T 9/001 |
| 2025/0024075 A1* | 1/2025 | Shin | H04N 19/597 |
| 2025/0029285 A1* | 1/2025 | Kuma | G06T 9/001 |
| 2025/0104286 A1* | 3/2025 | Takada | G06T 9/002 |
| 2025/0111581 A1* | 4/2025 | Pan | G06T 19/20 |
| 2025/0139835 A1* | 5/2025 | Marvie | G06T 15/04 |
| 2025/0148648 A1* | 5/2025 | Marvie | G06T 7/10 |
| 2025/0168403 A1* | 5/2025 | Kato | G06T 9/00 |
| 2025/0211784 A1* | 6/2025 | Ricard | G06T 17/205 |
| 2025/0254282 A1* | 8/2025 | Chupeau | H04N 13/194 |
| 2025/0265778 A1* | 8/2025 | Monaci | G06T 15/20 |
| 2025/0278811 A1* | 9/2025 | Rhyu | H04N 21/816 |
| 2025/0280150 A1* | 9/2025 | Chupeau | H04N 19/20 |

FOREIGN PATENT DOCUMENTS

| | | | |
|---|---|---|---|
| WO | | 2021053261 A1 | 3/2021 |
| WO | WO 2021122983 A1 | | 6/2021 |
| WO | | 2021211173 A1 | 10/2021 |

OTHER PUBLICATIONS

M. Chen and J. Arvo, "Perturbation methods for interactive specular reflections," in IEEE Transactions on Visualization and Computer Graphics, vol. 6, No. 3, pp. 253-264, Jul.-Sep. 2000, doi: 10.1109/2945.879786. (Year: 2000).*

T. Machida, N. Yokoya and H. Takemura, "GPU Accelerated Inverse Photon Mapping for Real-Time Surface Reflectance Modeling," 2006 IEEE International Conference on Multimedia and Expo, Toronto, ON, Canada, 2006, pp. 645-648, doi: 10.1109/ICME.2006.262528. (Year: 2006).*

Nvidia, "Chapter 7. Environment Mapping Techniques", The Cg Tutorial, chapter 7, https://developer.download.nvidia.com/CgTutorial/cg_tutorial_frontmatter.html, 2003. (Year: 2003).*

Anonymous, "Information Technology—Coding of Audio-Visual Objects—Part 10: Advanced Video Coding", International Standard, ISO/IEC 14496-10, Second Edition, Oct. 1, 2004, 280 pages.

Grange, et al., "VP9 Bitstream & Decoding Process Specification", Google, Inc., Version 0.6, Mar. 31, 2016, 171 pages.

ITU, "Information Technology—Digital Compression and Coding of Continuous-Tone Still Images—Requirements and Guidelines", Terminal Equipment and Protocols for Telematic Services, The International Telegraph and Telephone Consultative Committee (CCITT), T.81, Sep. 1992, 186 pages.

ITU-T, "Advanced video coding for generic audiovisual services", ITU-T H.264, International Telecommunication Union, ITU-T Telecommunication Standardization Sector of ITU, Series H: Audiovisual and Multimedia Systems, Infrastructure of Audiovisual Services—Coding of Moving Video, Jan. 2012, pp. 1-680.

ITU-T, "High Efficiency Video Coding", H.265, Telecommunications Standardization Sector of ITU, Series H: Audiovisual and Multimedia Systems, Infrastructure of Audiovisual Services—Coding of Moving Video, Oct. 2014, 540 pages.

ITU-T, "High Efficiency Video Coding", Recommendation ITU-T H.265, Series H: Audiovisual and Multimedia Systems, Infrastructure of Audiovisual Services—Coding of Moving Video, Feb. 2018, 692 pages.

Rivaz, et al., "AV1 Bitstream & Decoding Process Specification", The Alliance for Open Media, AC1 Bitstream Specification V 1.0.0, AOMediaCodec/ac1-spec project, Jun. 25, 2018, 677 pages.

(56) References Cited

OTHER PUBLICATIONS

Naik et al., "Surface Lightfield Support in Video-based Point Cloud Coding", Institute of Electrical and Electronics Engineers (IEEE), 2020 IEEE 22nd International Workshop on Multimedia Signal Processing (MMSP), Tampere, Finland, Sep. 21, 2020, 6 pages.

Fleureau et al., "CE2.6-related: Non-Lambertian Light Effect Baking", International Organization for Standardization, ISO/IEC JTC1/SC29/WG11, Coding of Moving Pictures and Audio, MPEG2019/52415, Brussels, Belgium, Jan. 2020, 14 pages.

Lensch et al., "Realistic Materials in Computer Graphics", Association for Computing Machinery (ACM), SIGGRAPH '05: ACM SIGGRAPH 2005 Courses, Jul. 31, 2005, 244 pages.

Boyce et al., "MPEG Immersive Video Coding Standard", Institute of Electrical and Electronics Engineers (IEEE), Proceedings of the IEEE, vol. 109, Issue No. 9, Sep. 2021, 16 pages.

* cited by examiner

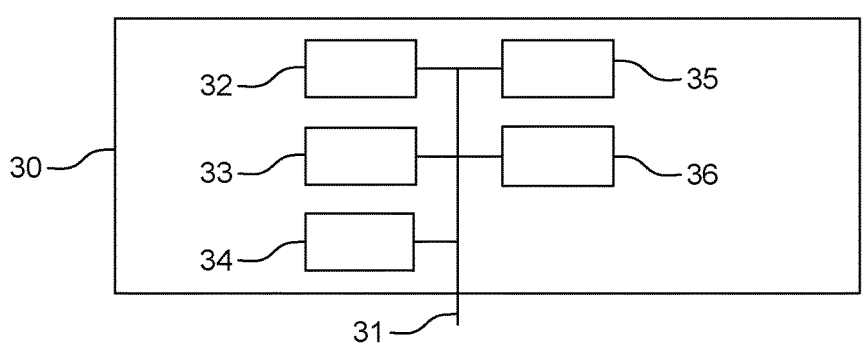
Figure 3
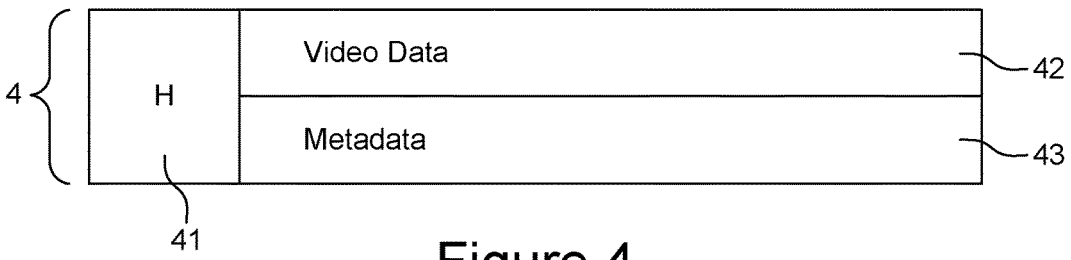
Figure 4
Figure 5

Figure 11

VOLUMETRIC VIDEO SUPPORTING LIGHT EFFECTS

CROSS REFERENCE TO RELATED APPLICATIONS

This application is a U.S. National Stage Application under 35 U.S.C. § 371 of International Patent Application No. PCT/EP2022/058896, filed Apr. 4, 2022, which is incorporated herein by reference in its entirety.

This application claims priority to European Application No. 21305440.6, filed Apr. 7, 2021, which is incorporated herein by reference in its entirety.

TECHNICAL FIELD

The present principles generally relate to the domain of three-dimensional (3D) scene and volumetric video content. The present document is also understood in the context of the encoding, the formatting and the decoding of data representative of the texture and the geometry of a 3D scene for a rendering of volumetric content on end-user devices such as mobile devices or Head-Mounted Displays (HMD). In particular, the present document relates to the encoding of a volumetric scene in a way to allow a rendering that can handle specular reflections and other complex light effects from various points of views.

BACKGROUND

The present section is intended to introduce the reader to various aspects of art, which may be related to various aspects of the present principles that are described and/or claimed below. This discussion is believed to be helpful in providing the reader with background information to facilitate a better understanding of the various aspects of the present principles. Accordingly, it should be understood that these statements are to be read in this light, and not as admissions of prior art.

Recently there has been a growth of available large field-of-view content (up to 360°). Such content is potentially not fully visible by a user watching the content on immersive display devices such as Head Mounted Displays, smart glasses, PC screens, tablets, smartphones and the like. That means that at a given moment, a user may only be viewing a part of the content. However, a user can typically navigate within the content by various means such as head movement, mouse movement, touch screen, voice and the like. It is typically desirable to encode and decode this content.

Immersive video, also called 360° flat video, allows the user to watch all around himself through rotations of his head around a still point of view. Rotations only allow a 3 Degrees of Freedom (3DoF) experience. Even if 3DoF video is sufficient for a first omnidirectional video experience, for example using a Head-Mounted Display device (HMD), 3DoF video may quickly become frustrating for the viewer who would expect more freedom, for example by experiencing parallax. In addition, 3DoF may also induce dizziness because of a user never only rotates his head but also translates his head in three directions, translations which are not reproduced in 3DOF video experiences.

A large field-of-view content may be, among others, a three-dimension computer graphic imagery scene (3D CGI scene), a point cloud or an immersive video. Many terms might be used to design such immersive videos: Virtual Reality (VR), 360, panoramic, 4π steradians, immersive, omnidirectional or large field of view for example.

Volumetric video (also known as 6 Degrees of Freedom (6DoF) video) is an alternative to 3DoF video. When watching a 6DoF video, in addition to rotations, the user can also translate his head, and even his body, within the watched content and experience parallax and even volumes. Such videos considerably increase the feeling of immersion and the perception of the scene depth and prevent from dizziness by providing consistent visual feedback during head translations. The content is created by the means of dedicated sensors allowing the simultaneous recording of color and depth of the scene of interest. The use of rig of color cameras combined with photogrammetry techniques is a way to perform such a recording, even if technical difficulties remain.

While 3DoF videos comprise a sequence of images resulting from the un-mapping of texture images (e.g. spherical images encoded according to latitude/longitude projection mapping or equirectangular projection mapping), 6DoF video frames embed information from several points of views. They can be viewed as a temporal series of point clouds resulting from a three-dimension capture. Two kinds of volumetric videos may be considered depending on the viewing conditions. A first one (i.e. complete 6DoF) allows a complete free navigation within the video content whereas a second one (aka. 3DoF+) restricts the user viewing space to a limited volume called viewing bounding box, allowing limited translation of the head and parallax experience. This second context is a valuable trade-off between free navigation and passive viewing conditions of a seated audience member.

In such videos, the viewport image that the user is watching at is a synthetized view, that is a view on the scene that has not been captured by a camera. Existing 3DoF+ video formats are not able to handle specular reflections and other complex light effects and assume that the 3D scene is composed of Lambertian surfaces (i.e. with diffuse reflection only). However, when a specular reflection is captured by one camera of the acquisition rig, as observed from the point of view of this camera, rendering the 3D scene from a different virtual viewpoint requires modifying the position and appearance of the reflected content according to the new point of view. Moreover, as a rendered virtual view is generated by blending patches originating from several input views, each one having captured a given reflection at different positions in the frame. Replications of the reflected objects may be observed at the rendering. Thus, there is a lack of a 3DoF+ video format that support complex light effect at rendering.

SUMMARY

The following presents a simplified summary of the present principles to provide a basic understanding of some aspects of the present principles. This summary is not an extensive overview of the present principles. It is not intended to identify key or critical elements of the present principles. The following summary merely presents some aspects of the present principles in a simplified form as a prelude to the more detailed description provided below.

The present principles relate a method of method for encoding a 3D scene. The method comprises:

for parts of the 3D scene, obtaining first color patches, reflectance patches and first depth patches;

for parts out of the 3D scene reflected in at least one part of the 3D scene, obtaining second color patches and second depth patches;

generating a depth atlas by packing first and second depth patches;

generating a color atlas by packing the second color patches and a subset of the first color patches;

generating a reflectance atlas by packing a subset of the reflectance patches;

for each reflectance patch packed in the reflectance atlas, generating first information encoding parameters of a Bidirectional Reflectance Distribution Function model of a reflection of the light on the reflectance patch, and generating second information indicating a list of color patches reflected into the reflectance patch; and encoding in a data stream:
the depth atlas, the color atlas, the reflectance atlas and the first; and
second information in a data stream.

In a first embodiment, the subset of the first color patches packed in the color atlas is empty; and the subset of the reflectance patches packed in the reflectance atlas comprises every reflectance patch. In a second embodiment, the subset of the first color patches packed in the color atlas corresponds to Lambertian parts of the 3D scene; and the subset of the reflectance patches packed in the reflectance atlas corresponds to non-diffuse reflecting parts of the 3D scene. In a third embodiment, the subset of the first color patches packed in the color atlas comprises every first color patch; and the subset of the reflectance patches packed in the reflectance atlas corresponds to non-diffuse reflecting parts of the 3D scene. In a variant, the method further comprises generating a surface normal atlas by packing surface normal patches corresponding to the subset of the reflectance patches in the reflectance atlas.

The present principles also relate to a device comprising a processor associated with a memory, the processor being configured to execute the method above.

The present principles also relate to a data stream encoding a 3D scene comprising:

a depth atlas packing first depth patches corresponding to parts of the 3D scene and second depth patches corresponding to parts out of the 3D scene reflected in at least one part of the 3D scene;

a color atlas packing first color patches corresponding to parts of the 3D scene and second color patches corresponding to parts out of the 3D scene reflected in at least one part of the 3D scene;

a reflectance atlas packing reflectance patches corresponding to parts of the 3D scene; and for each reflectance patch packed in the reflectance atlas,
first information encoding parameters of a Bidirectional Reflectance Distribution Function model of the light reflection on the reflectance patch, and
second information indicating a list of color patches reflected into the reflectance patch.

The present principles also relate to a method of rendering a 3D scene. The method comprises:

decoding from a data stream:
a depth atlas packing first depth patches corresponding to parts of the 3D scene and second depth patches corresponding to parts out of the 3D scene reflected in at least one part of the 3D scene;
a color atlas packing first color patches corresponding to parts of the 3D scene and second color patches corresponding to parts out of the 3D scene reflected in at least one part of the 3D scene;

a reflectance atlas packing reflectance patches corresponding to parts of the 3D scene;

information signaling a rendering mode determined according to the first color patches and the reflectance patches; and for each reflectance patch packed in the reflectance atlas,
first information encoding parameters of a Bidirectional Reflectance Distribution Function model of the light reflection on the reflectance patch, and
second information indicating a list of color patches reflected into the reflectance patch; and rendering the 3D scene by un-projecting the first and second color patches according to the first and second depth patches and by using ray tracing for reflectance patches according to first and second information and associated color patches.

BRIEF DESCRIPTION OF DRAWINGS

The present disclosure will be better understood, and other specific features and advantages will emerge upon reading the following description, the description making reference to the annexed drawings wherein:

FIG. 3 shows an example architecture of a device which may be configured to implement a method described in relation with FIGS. 13 and 14, according to a non-limiting embodiment of the present principles;

FIG. 4 shows an example of an embodiment of the syntax of a stream when the data are transmitted over a packet-based transmission protocol, according to a non-limiting embodiment of the present principles;

FIG. 5 illustrates the patch atlas approach with an example of 4 projection centers, according to a non-limiting embodiment of the present principles;

FIG. 11 shows a second example encoding the 3D scene of FIG. 9 in a depth atlas, a reflectance atlas and a color atlas according to a second embodiment of the present principles;

DETAILED DESCRIPTION OF EMBODIMENTS

Figure 1:
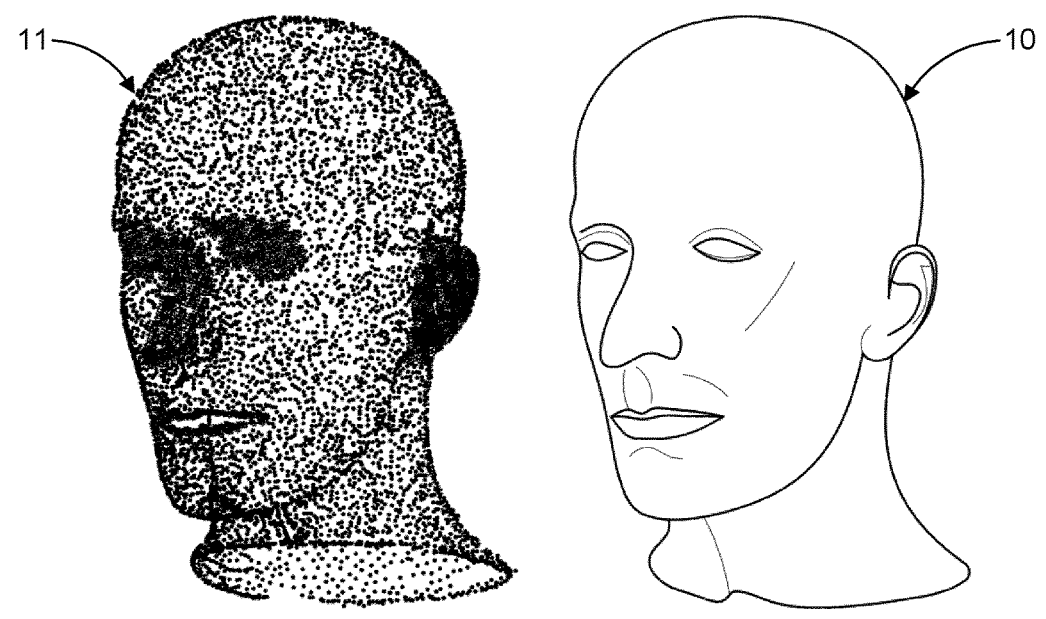
FIG. 1 shows a three-dimensional (3D) model of an object and points of a point cloud corresponding to the 3D model, according to a non-limiting embodiment of the present principles.

The present principles will be described more fully hereinafter with reference to the accompanying figures, in which examples of the present principles are shown. The present principles may, however, be embodied in many alternate forms and should not be construed as limited to the examples set forth herein. Accordingly, while the present principles are susceptible to various modifications and alternative forms, specific examples thereof are shown by way of examples in the drawings and will herein be described in detail. It should be understood, however, that there is no intent to limit the present principles to the particular forms disclosed, but on the contrary, the disclosure is to cover all modifications, equivalents, and alternatives falling within the spirit and scope of the present principles as defined by the claims.

The terminology used herein is for the purpose of describing particular examples only and is not intended to be limiting of the present principles. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to other element, there are no intervening elements present. As used herein the term "and/or" includes any and all combinations of one or more of the associated listed items and may be abbreviated as"/".

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the present principles.

Although some of the diagrams include arrows on communication paths to show a primary direction of communication, it is to be understood that communication may occur in the opposite direction to the depicted arrows.

Some examples are described with regard to block diagrams and operational flowcharts in which each block represents a circuit element, module, or portion of code which comprises one or more executable instructions for implementing the specified logical function(s). It should also be noted that in other implementations, the function(s) noted in the blocks may occur out of the order noted. For example, two blocks shown in succession may, in fact, be executed substantially concurrently or the blocks may sometimes be executed in the reverse order, depending on the functionality involved.

Reference herein to "in accordance with an example" or "in an example" means that a particular feature, structure, or characteristic described in connection with the example can be included in at least one implementation of the present principles. The appearances of the phrase in accordance with an example" or "in an example" in various places in the specification are not necessarily all referring to the same example, nor are separate or alternative examples necessarily mutually exclusive of other examples.

Reference numerals appearing in the claims are by way of illustration only and shall have no limiting effect on the scope of the claims. While not explicitly described, the present examples and variants may be employed in any combination or sub-combination.

FIG. 1 shows a three-dimensional (3D) model 10 of an object and points of a point cloud 11 corresponding to 3D model 10. 3D model 10 and the point cloud 11 may for example correspond to a possible 3D representation of an object of the 3D scene comprising other objects. Model 10 may be a 3D mesh representation and points of point cloud 11 may be the vertices of the mesh. Points of point cloud 11 may also be points spread on the surface of faces of the mesh. Model 10 may also be represented as a splatted version of point cloud 11, the surface of model 10 being created by splatting the points of the point cloud 11. Model 10 may be represented by a lot of different representations such as voxels or splines. FIG. 1 illustrates the fact that a point cloud may be defined with a surface representation of a 3D object and that a surface representation of a 3D object may be generated from a point of cloud. As used herein, projecting points of a 3D object (by extension points of a 3D scene) onto an image is equivalent to projecting any representation of this 3D object, for example a point cloud, a mesh, a spline model or a voxel model.

A point cloud may be represented in memory, for instance, as a vector-based structure, wherein each point has its own coordinates in the frame of reference of a viewpoint (e.g. three-dimensional coordinates XYZ, or a solid angle and a distance (also called depth) from/to the viewpoint) and one or more attributes, also called component. An example of component is the color component that may be expressed in various color spaces, for example RGB (Red, Green and Blue) or YUV (Y being the luma component and UV two chrominance components). The point cloud is a representation of a 3D scene comprising objects. The 3D scene may be seen from a given viewpoint or a range of viewpoints. The point cloud may be obtained by many ways, e.g.:

- from a capture of a real object shot by a rig of cameras, optionally complemented by depth active sensing device;
- from a capture of a virtual/synthetic object shot by a rig of virtual cameras in a modelling tool;
- from a mix of both real and virtual objects.

A 3D scene corresponds to a captured scene, that is a part of a real (or virtual) scene. First, some parts or the scene to be captured are invisible (because occulted) from every camera; these parts are out of the 3D scene. Second, the field of view of the rig of cameras may be lower that 360°. Then a part of the real scene remains out of the captured 3D scene. Nevertheless, some parts out of the 3D scene may be reflected on parts of the 3D scene.

Figure 2:
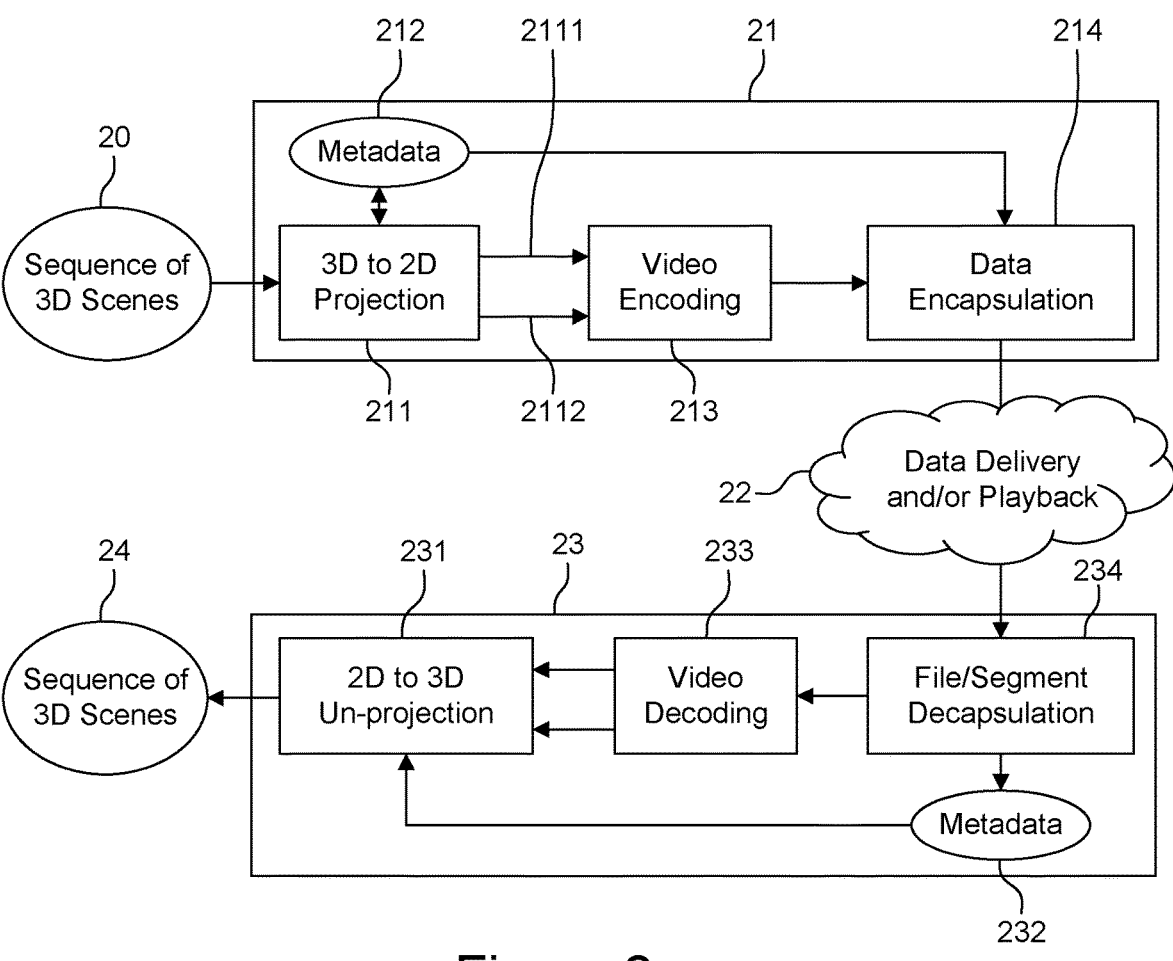
FIG. 2 shows a non-limitative example of the encoding, transmission and decoding of data representative of a sequence of 3D scenes, according to a non-limiting embodiment of the present principles.

FIG. 2 shows a non-limitative example of the encoding, transmission and decoding of data representative of a sequence of 3D scenes. The encoding format that may be, for example and at the same time, compatible for 3DoF, 3DoF+ and 6DoF decoding.

A sequence of 3D scenes 20 is obtained. As a sequence of pictures is a 2D video, a sequence of 3D scenes is a 3D (also called volumetric) video. A sequence of 3D scenes may be provided to a volumetric video rendering device for a 3DoF, 3Dof+ or 6DoF rendering and displaying.

Sequence of 3D scenes 20 is provided to an encoder 21. The encoder 21 takes one 3D scenes or a sequence of 3D scenes as input and provides a bit stream representative of the input. The bit stream may be stored in a memory 22 and/or on an electronic data medium and may be transmitted over a network 22. The bit stream representative of a sequence of 3D scenes may be read from a memory 22 and/or received from a network 22 by a decoder 23. Decoder 23 is inputted by said bit stream and provides a sequence of 3D scenes, for instance in a point cloud format.

Encoder 21 may comprise several circuits implementing several steps. In a first step, encoder 21 projects each 3D scene onto at least one 2D picture. 3D projection is any method of mapping three-dimensional points to a two-dimensional plane. As most current methods for displaying graphical data are based on planar (pixel information from several bit planes) two-dimensional media, the use of this type of projection is widespread, especially in computer graphics, engineering and drafting. Projection circuit 211 provides at least one two-dimensional frame 2111 for a 3D scene of sequence of 3D scenes 20. Frame 2111 comprises depth information representative of the 3D scene projected onto frame 2111. In a variant, Frame 2111 comprises other attributes. According to the present principles, projected attributes may be representative of the texture (i.e. color attribute), the heat, the reflectance or other attribute of the 3D scene projected on the frame. In a variant, information is encoded in separate frames, for instance two separate frames 2111 and 2112 or in one frame per attribute.

Metadata 212 are used and updated by projection circuit 211. Metadata 212 comprise information about the projection operation (e.g. projection parameters) and about the way color and depth information is organized within frames 2111 and 2112 as described in relation to FIGS. 5 to 7.

A video encoding circuit 213 encodes sequence of frames 2111 and 2112 as a video. Pictures of a 3D scene 2111 and 2112 (or a sequence of pictures of the 3D scene) is encoded in a stream by video encoder 213. Then video data and metadata 212 are encapsulated in a data stream by a data encapsulation circuit 214.

Encoder 213 is for example compliant with an encoder such as:

JPEG, specification ISO/CEI 10918-1 UIT-T Recommendation T.81, https://www.itu.int/rec/T-REC-T.81/en;

AVC, also named MPEG-4 AVC or h264. Specified in both UIT-T H.264 and ISO/CEI MPEG-4 Part 10 (ISO/CEI 14496-10), http://www.itu.int/rec/T-REC-H.264/en, HEVC (its specification is found at the ITU website, T recommendation, H series, h265, http://www.itu.int/rec/T-REC-H.265-201612-I/en);

3D-HEVC (an extension of HEVC whose specification is found at the ITU website, T recommendation, H series, h265, http://www.itu.int/rec/T-REC-H.265-201612-I/en annex G and I);

VP9 developed by Google; or

AV1 (AOMedia Video 1) developed by Alliance for Open Media.

The data stream is stored in a memory that is accessible, for example through a network 22, by a decoder 23. Decoder 23 comprises different circuits implementing different steps of the decoding. Decoder 23 takes a data stream generated by an encoder 21 as an input and provides a sequence of 3D scenes 24 to be rendered and displayed by a volumetric video display device, like a Head-Mounted Device (HMD).

Decoder 23 obtains the stream from a source 22. For example, source 22 belongs to a set comprising:

a local memory, e.g. a video memory or a RAM (or Random-Access Memory), a flash memory, a ROM (or Read Only Memory), a hard disk;

a storage interface, e.g. an interface with a mass storage, a RAM, a flash memory, a ROM, an optical disc or a magnetic support;

a communication interface, e.g. a wireline interface (for example a bus interface, a wide area network interface, a local area network interface) or a wireless interface (such as a IEEE 802.11 interface or a Bluetooth® interface); and a user interface such as a Graphical User Interface enabling a user to input data.

Decoder 23 comprises a circuit 234 for extract data encoded in the data stream. Circuit 234 takes a data stream as input and provides metadata 232 corresponding to metadata 212 encoded in the stream and a two-dimensional video. The video is decoded by a video decoder 233 which provides a sequence of frames. Decoded frames comprise color and depth information. In a variant, video decoder 233 provides two sequences of frames, one comprising color information, the other comprising depth information. A circuit 231 uses metadata 232 to un-project color and depth information from decoded frames to provide a sequence of 3D scenes 24. Sequence of 3D scenes 24 corresponds to sequence of 3D scenes 20, with a possible loss of precision related to the encoding as a 2D video and to the video compression.

At the rendering, the viewport images that the user is watching at are synthetized views, that is views on the scene that has not been captured by a camera. If a specular reflection is captured by one camera of the acquisition rig, as observed from the point of view of this camera, rendering the 3D scene from a different virtual viewpoint requires modifying the position and appearance of the reflected content according to the new point of view. According to the present principles, information for a rendering of complex light effect is carried in the data stream.

Figure 13:
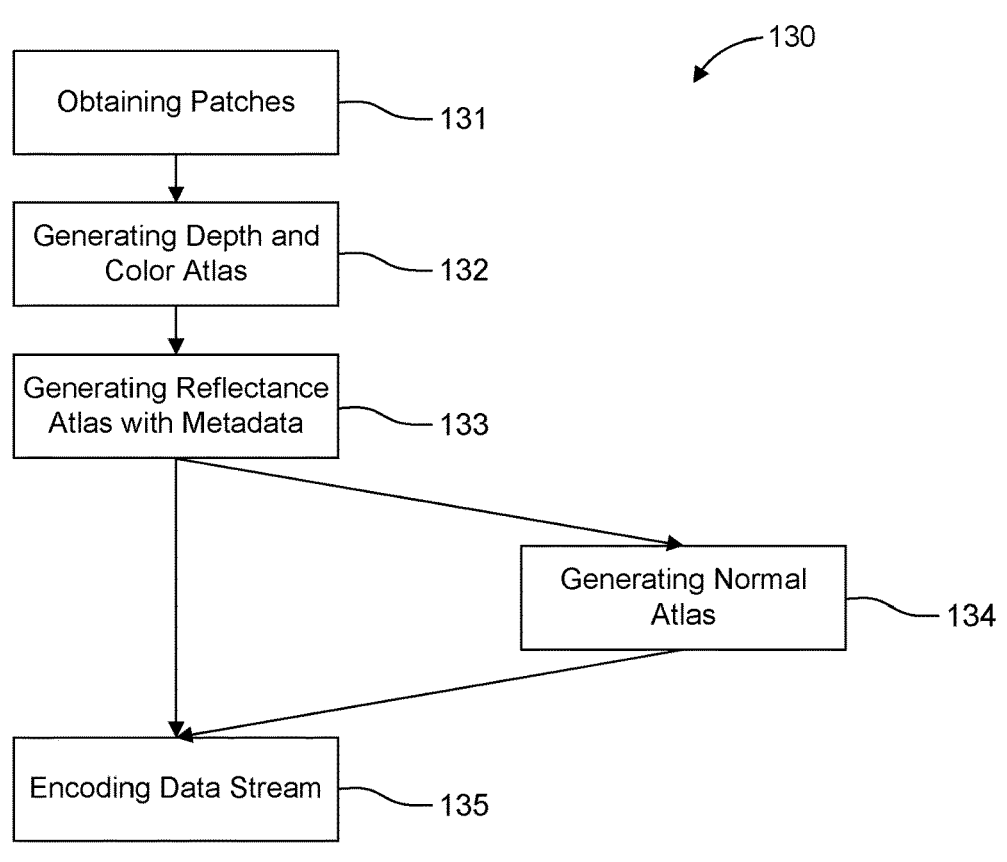
FIG. 13 illustrates a method for encoding a 3D scene with complex light effects.
Figure 14:
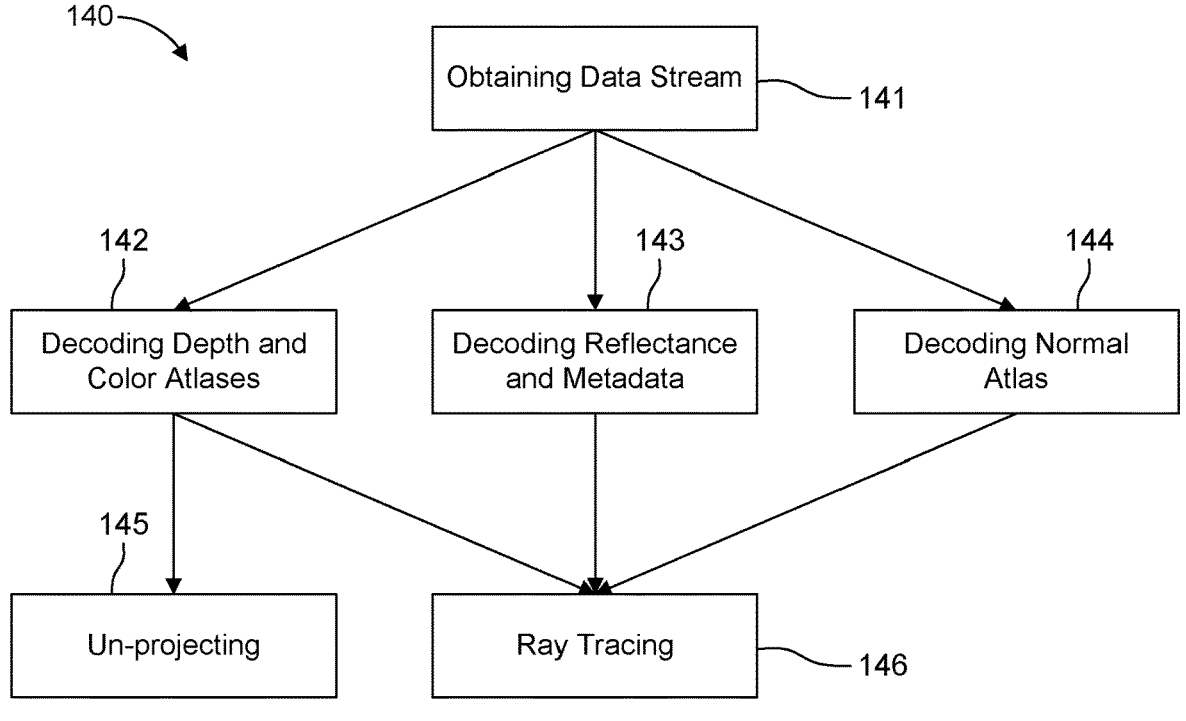
FIG. 14 illustrates a method for rendering a 3D scene with complex light effects.

FIG. 3 shows an example architecture of a device 30 which may be configured to implement a method described in relation with FIGS. 13 and 14. Encoder 21 and/or decoder 23 of FIG. 2 may implement this architecture. Alternatively, each circuit of encoder 21 and/or decoder 23 may be a device according to the architecture of FIG. 3, linked together, for instance, via their bus 31 and/or via I/O interface 36.

Device 30 comprises following elements that are linked together by a data and address bus 31:

a microprocessor 32 (or CPU), which is, for example, a DSP (or Digital Signal Processor);

a ROM (or Read Only Memory) 33;

a RAM (or Random Access Memory) 34;

a storage interface 35;

an I/O interface 36 for reception of data to transmit, from an application; and a power supply, e.g. a battery.

In accordance with an example, the power supply is external to the device. In each of mentioned memory, the word «register» used in the specification may correspond to area of small capacity (some bits) or to very large area (e.g. a whole program or large amount of received or decoded data). The ROM 33 comprises at least a program and parameters. The ROM 33 may store algorithms and instructions to perform techniques in accordance with present principles. When switched on, the CPU 32 uploads the program in the RAM and executes the corresponding instructions.

The RAM 34 comprises, in a register, the program executed by the CPU 32 and uploaded after switch-on of the device 30, input data in a register, intermediate data in different states of the method in a register, and other variables used for the execution of the method in a register.

The implementations described herein may be implemented in, for example, a method or a process, an apparatus, a computer program product, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

In accordance with examples, the device 30 is configured to implement a method described in relation with FIGS. 13 and 14, and belongs to a set comprising:

a mobile device;

a communication device;

a game device;

a tablet (or tablet computer);

a laptop;

a still picture camera;

a video camera;

an encoding chip;

a server (e.g. a broadcast server, a video-on-demand server or a web server).

FIG. 4 shows an example of an embodiment of the syntax of a stream when the data are transmitted over a packet-based transmission protocol. FIG. 4 shows an example structure 4 of a volumetric video stream. The structure consists in a container which organizes the stream in independent elements of syntax. The structure may comprise a header part 41 which is a set of data common to every syntax elements of the stream. For example, the header part comprises some of metadata about syntax elements, describing the nature and the role of each of them. The header part may also comprise a part of metadata 212 of FIG. 2, for instance the coordinates of a central point of view used for projecting points of a 3D scene onto frames 2111 and 2112. The structure comprises a payload comprising an element of syntax 42 and at least one element of syntax 43. Syntax element 42 comprises data representative of the color and depth frames. Images may have been compressed according to a video compression method.

Element of syntax 43 is a part of the payload of the data stream and may comprise metadata about how frames of element of syntax 42 are encoded, for instance parameters used for projecting and packing points of a 3D scene onto frames. Such metadata may be associated with each frame of the video or to group of frames (also known as Group of Pictures (GoP) in video compression standards).

FIG. 5 illustrates the patch atlas approach with an example of 4 projection centers. 3D scene 50 comprises a character. For instance, center of projection 51 is a perspective camera and camera 53 is an orthographic camera.

Cameras may also be omnidirectional cameras with, for instance a spherical mapping (e.g. Equi-Rectangular mapping) or a cube mapping. The 3D points of the 3D scene are projected onto the 2D planes associated with virtual cameras located at the projection centers, according to a projection operation described in projection data of metadata. In the example of FIG. 5, projection of the points captured by camera 51 is mapped onto patch 52 according to a perspective mapping and projection of the points captured by camera 53 is mapped onto patch 54 according to an orthographic mapping.

The clustering of the projected pixels yields a multiplicity of 2D patches, which are packed in a rectangular atlas 55. The organization of patches within the atlas defines the atlas layout. In an embodiment, two atlases with identical layout: one for texture (i.e. color) information and one for depth information. Two patches captured by a same camera or by two distinct cameras may comprise information representative of a same part of the 3D scene, like, for instance patches 54 and 56.

The packing operation produces a patch data for each generated patch. A patch data comprises a reference to a projection data (e.g. an index in a table of projection data or a pointer (i.e. address in memory or in a data stream) to a projection data) and information describing the location and the size of the patch within the atlas (e.g. top left corner coordinates, size and width in pixels). Patch data items are added to metadata to be encapsulated in the data stream in association with the compressed data of the one or two atlases.

Figure 6:
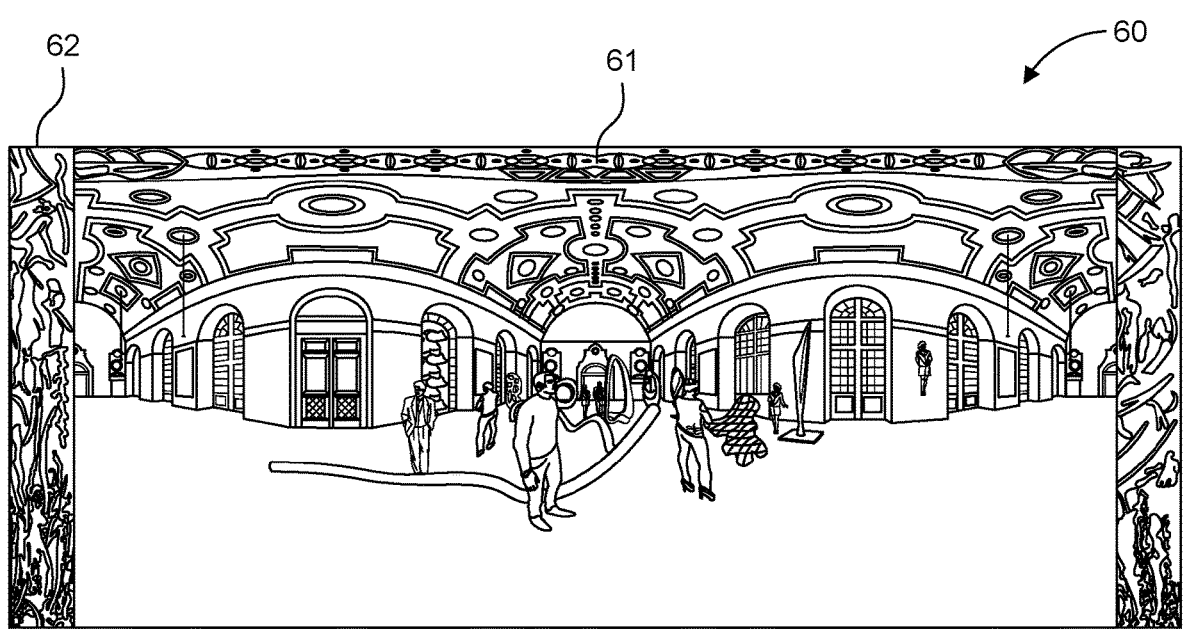
FIG. 6 shows an example of an atlas comprising the texture information of the points of a 3D scene, according to a non-limiting embodiment of the present principles.

FIG. 6 shows an example of an atlas 60 comprising an attribute information, for example the texture (also called color) information (e.g. RGB data or YUV data) of the points of a 3D scene, according to a non-limiting embodiment of the present principles. As explained in relation to FIG. 5, an atlas is an image packing patches, a patch being a picture obtained by projecting a part of the points of the 3D scene.

In the example of FIG. 6, atlas 60 comprises a first part 61 comprising the texture information of the points of the 3D scene that are visible from a point of view and one or more second parts 62. The texture information of first part 61 may for example be obtained according to an equirectangular projection mapping, an equirectangular projection mapping being an example of spherical projection mapping. In the example of FIG. 6, the second parts 62 are arranged at the left and right borders of first part 61 but the second parts may be arranged differently. Second parts 62 comprise texture information of parts of the 3D scene that are complementary to the part visible from the point of view. The second parts may be obtained by removing from the 3D scene the points that are visible from the first viewpoint (the texture of which being stored in the first part) and by projecting the remaining points according to the same point of view. The latter process may be reiterated iteratively to obtain at each time the hidden parts of the 3D scene. According to a variant, the second parts may be obtained by removing from the 3D scene the points that are visible from the point of view, for example a central point of view, (the texture of which being stored in the first part) and by projecting the remaining points according to a point of view different from the first point of view, for example from one or more second point of view of a space of view centred onto the central point of view (e.g. the viewing space of a 3DoF rendering).

First part 61 may be seen as a first large texture patch (corresponding to a first part of the 3D scene) and the second parts 62 comprises smaller textures patches (corresponding to second parts of the 3D scene that are complementary to the first part). Such an atlas has the advantage to be compatible at the same time with 3DoF rendering (when rendering only first part 61) and with 3DoF+/6DoF rendering.

Figure 7:
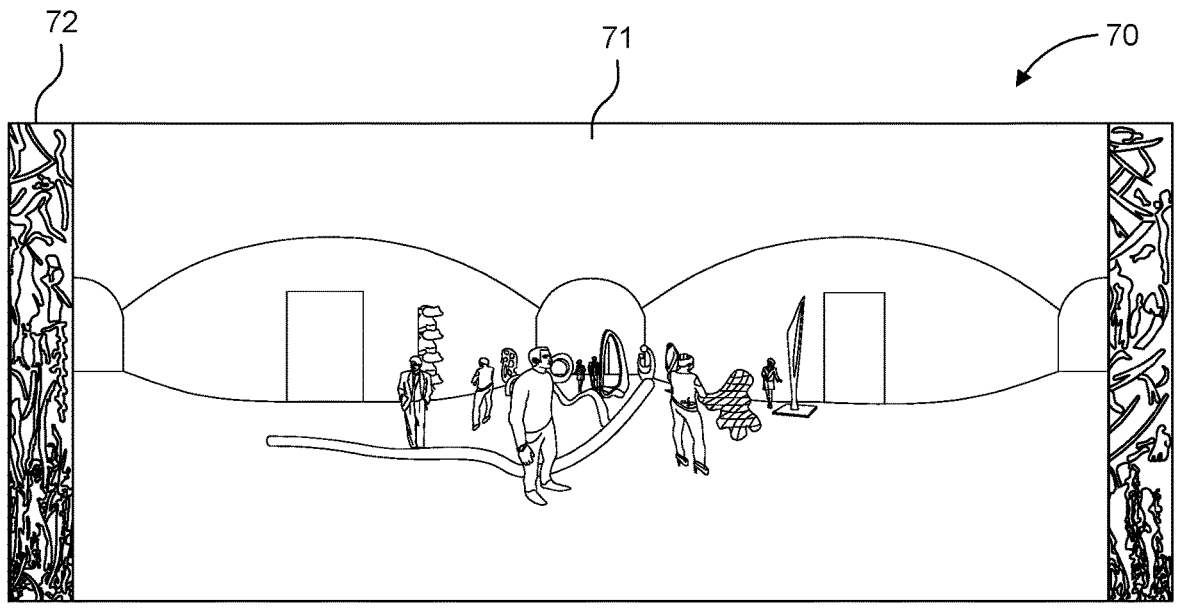
FIG. 7 shows an example of an atlas comprising the depth information of the points of the 3D scene of FIG. 6, according to a non-limiting embodiment of the present principles.

FIG. 7 shows an example of an atlas 70 comprising the depth information of the points of the 3D scene of FIG. 6, according to a non-limiting embodiment of the present principles. Atlas 70 may be seen as the depth image corresponding to texture image 60 of FIG. 6.

Atlas 70 comprises a first part 71 comprising the depth information of the points of the 3D scene that are visible from the central point of view and one or more second parts 72. Atlas 70 may be obtained in a same way as atlas 60 but contains the depth information associated with the points of the 3D scene instead of the texture information.

For 3DoF rendering of the 3D scene, only one point of view, typically the central point of view, is considered. The user may rotate his head in three degrees of freedom around the first point of view to watch various parts of the 3D scene, but the user cannot move this unique point of view. Points of the scene to be encoded are points which are visible from this unique point of view, and only the texture information is needed to be encoded/decoded for the 3DoF rendering. There is no need to encode points of the scene that are not visible from this unique point of view for a 3DoF rendering as the user cannot access to them.

With regard to 6DoF rendering, the user may move the viewpoint everywhere in the scene. In this case, it is required to encode every point (depth and texture) of the scene in the bitstream as every point is potentially accessible by a user who can move his/her point of view. At the encoding stage, there is no means to know, a priori, from which point of view the user will observe the 3D scene.

With regard to 3DoF+ rendering, the user may move the point of view within a limited space around a central point of view. This enables to experience parallax. Data representative of the part of the scene visible from any point of the space of view is to be encoded into the stream, including the data representative of the 3D scene visible according to the central point of view (i.e. first parts 61 and 71). The size and shape of the space of view may for example be decided and determined at the encoding step and encoded in the bitstream. The decoder may obtain this information from the bitstream and the renderer limits the space of view to the space determined by the obtained information. According to another example, the renderer determines the space of view according to hardware constraints, for example in relation to capabilities of the sensor(s) that detects the movements of the user. In such a case, if, at the encoding phase, a point visible from a point within the space of view of the renderer has not been encoded in the bitstream, this point will not be rendered. According to a further example, data (e.g. texture and/or geometry) representative of every point of the 3D scene is encoded in the stream without considering the rendering space of view. To optimize the size of the stream, only a subset of the points of the scene may be encoded, for instance the subset of points that may be seen according to a rendering space of view.

According to the present principles, a volumetric video transmission format is proposed. The format comprises the signalling of non-Lambertian patches together with their light reflection properties, to enable a ray-tracing-based rendering engine to synthesize visually realistic virtual views with respect to light effects.

The syntax of the format according to the present principle comprise:

For each non-Lambertian patch:
    the reflectance attributes of the patch samples,
    the light reflection properties of the patch material (Bidirectional Reflectance Distribution Function), and
    the list of other patches reflected within the current patch,
The reflected patches found out of the scene viewing frustum, with their geometry and texture components, considered as light sources, and
The parameters of other punctual or diffuse light sources.

A retro-compatible embodiment enabling existing rendering engines to render such described 3D scene but without the advanced light effects is also described.

Figures 8, 9:
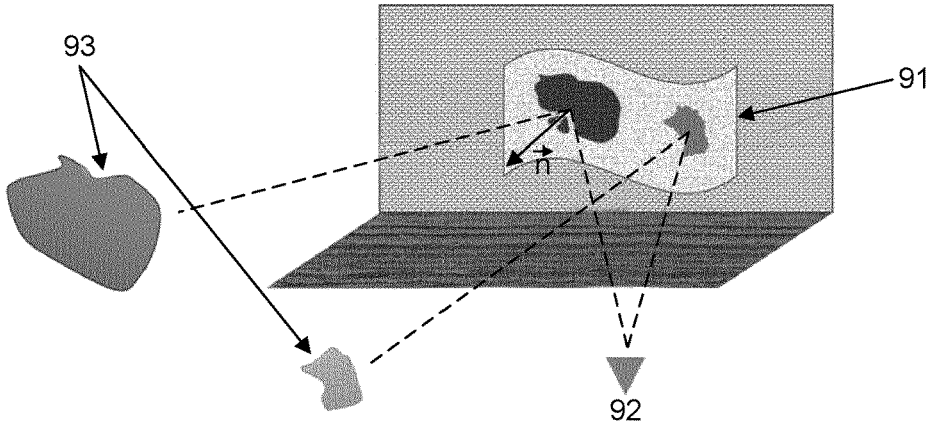
FIG. 8 shows two of views of a 3D scene captured by a camera array.
FIG. 9 shows a simple scene to be captured.

FIG. 8 shows two of views of a 3D scene captured by a camera array. View 811 is a view of the scene from upper and more at left than view 835. The 3D scene comprises reflective objects 81 and 82 (the oven door reflects a giant spider on the floor). Views 811 and 835 comprise information corresponding to the same points of the 3D scene. However, because of the lighting of the scene and the different acquisition positions, the color information associated with these points may be different from one view to another one. Views 811 also comprise information on points of the 3D scene which are not visible from the point of view of view 835 and reciprocally.

At least one atlas is generated to encode the 3D scene from the captured multi-view+depth (MVD) image by pruning redundant information and conserving some overlapping between pruned regions of the 3D space to help the stitching at the rendering. The atlas is supposed to be sufficient to reconstruct/synthesize any viewport image from any point of view within the 3DoF+ viewing space where the user may move. To do so, a synthesis process is performed which stitches all the patches from the atlas to recover the desired viewport image. However, this stitching step may be subject to strong artifacts when the scene represented in the atlas comprises specular/reflective or transparent components as illustrated in FIG. 8. Such light effects depend on the viewing position and thus, the perceived color of the concerned spatial parts may change from one viewpoint to the other.

FIG. 9 shows a scene to be captured, simplified for the sake of the description. This scene is composed of two planar surfaces with diffuse reflection (the "wall" and the "floor") and one non-planar surface 91 with both specular and diffuse reflection properties (the "mirror"). Two objects 93, located out of the viewing frustum of camera 92 (i.e. out of the captured 3D scene), are reflected into mirror 91.

Figure 10:
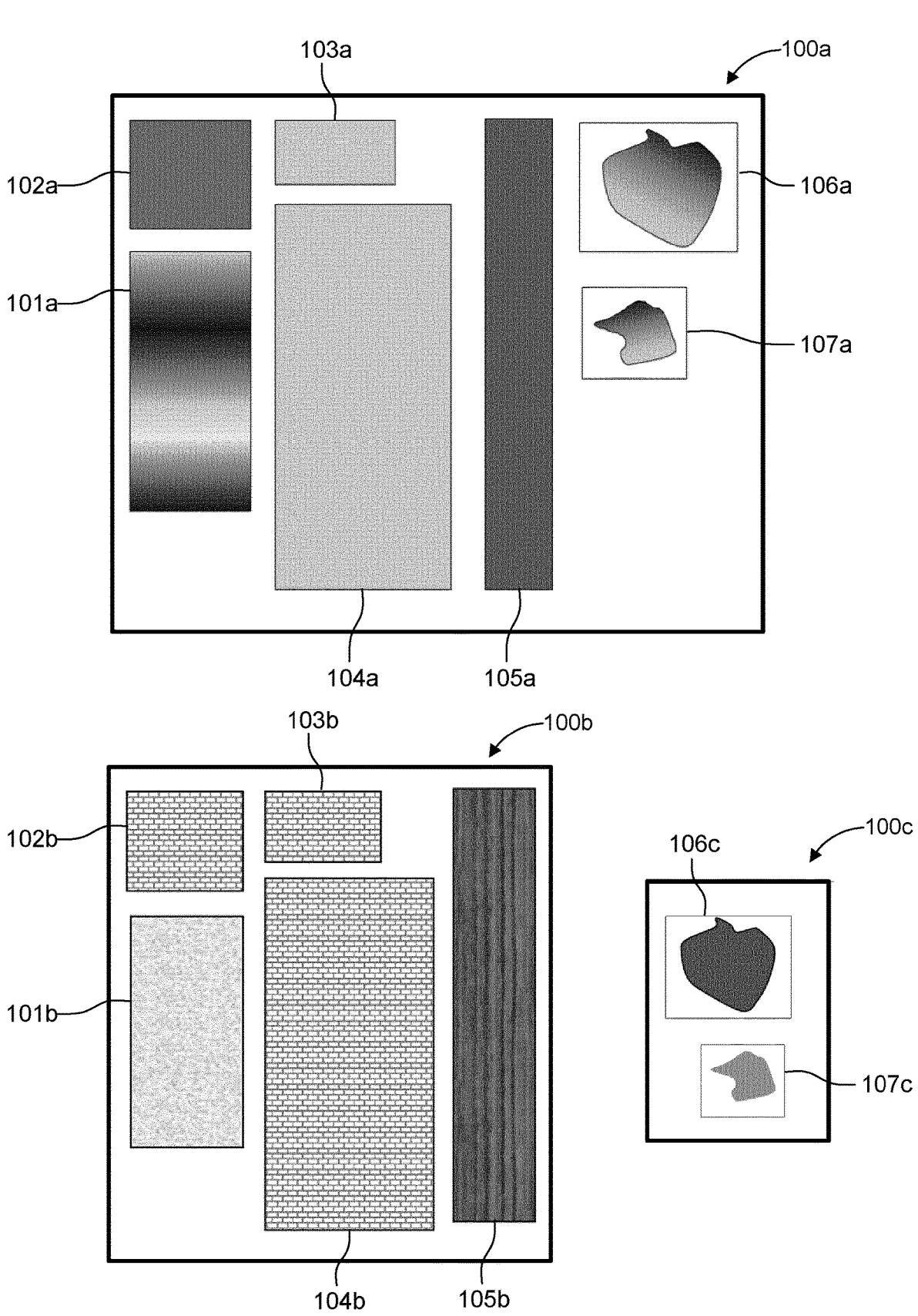
FIG. 10 shows a first example encoding the 3D scene of FIG. 9 in a depth atlas, a reflectance atlas and a color atlas according to a first embodiment of the present principles.

FIG. 10 shows an example encoding the 3D scene of FIG. 9 in a depth atlas 100a, a reflectance atlas 100b and a color atlas 100c according to a first embodiment of the present principles. Parts of the 3D scene and parts out of the 3D scene reflected onto at least one part of the 3D scene are projected onto patches as described in relation FIG. 5. For each patch sample, a depth value and different attribute values are obtained. According to the present principles, depth patches, color patches and reflectance patches are obtained for each of these parts.

In a first embodiment of the present principles, a depth atlas 100a is generated by packing every depth patches 101a to 107a (that is patches 101a to 105a obtained by projecting parts of the captured 3D scene as described in relation to FIG. 1 and patches 106a and 107a obtained by projecting parts out of the captured 3D scene reflected in at least one part of the 3D scene). In the example of FIG. 9, the mirror and the two objects reflected in the mirror are not planar.

Then, corresponding depth patches 101a, 106a and 107a store different depth values represented in grey gradients in FIG. 10.

A color atlas 100c is generated by packing color patches 106c, 107c of the parts out of the 3D scene reflected into at least one part of the 3D scene (in the example of FIG. 9: the two objects reflected in the non-planar mirror).

A reflectance atlas 100b is generated by packing reflectance patches 101b to 105b corresponding to projections of parts of the 3D scene. The reflectance attribute which describes the spectral reflectance properties of a patch sample can be specified, for example, with three dimensions, in the R, G and B channels of the atlas frame. Reflectance patch 101b corresponding to the mirror of FIG. 9 does comprise only the reflectance attribute of the projection of points corresponding to the mirror. Thus, reflected objects 93 are not visible in this patch. In every embodiment of the present principles, each reflectance patch is associated with information representative of a parametrized model which defines how light is reflected at its surface, also known as Bidirectional Reflectance Distribution Function (BRDF). Several BRDF parametrical models exist, among which the empirical Phong model is very used in the art. The Phong model is defined by the following four parameters:

ks, the ratio of reflection of the specular term of incoming light, kd, the ratio of reflection of the diffuse term of incoming light (Lambertian reflectance), ka, the ratio of reflection of the ambient term present in all points in the scene rendered, α, shininess constant for this material, which is larger for surfaces that are smoother and more mirror-like.

At the rendering, deriving the light reflection from the BRDF of the surface and the incident light requires the knowledge of the surface normal at each sample. Such normal values can either be computed from the depth map at rendering side, or, in a variant of every embodiments of the present principles, an additional normal attribute patch atlas is transmitted, along with depth atlas, the reflectance atlas and the color atlas. This variant is a trade-off between bandwidth and computing resources at rendering side.

In every embodiment of the present principles, for each patch of the reflectance atlas, a list of color patches which are reflected into the current patch is added to the patch parameters (i.e. metadata associated with the patch). In the example of FIG. 10, parameters of reflectance patch 101a indicate that reflectance patches 106c and 107c in the color atlas 100c are reflected into reflectance patch 101a. Without such information, the renderer would have to reconstruct and analyze the entire 3D scene geometry to retrieve this information.

A renderer based on ray-tracing techniques leverages the transmitted surface properties and synthesize realistic viewpoint-depending light effects.

Figure 11:
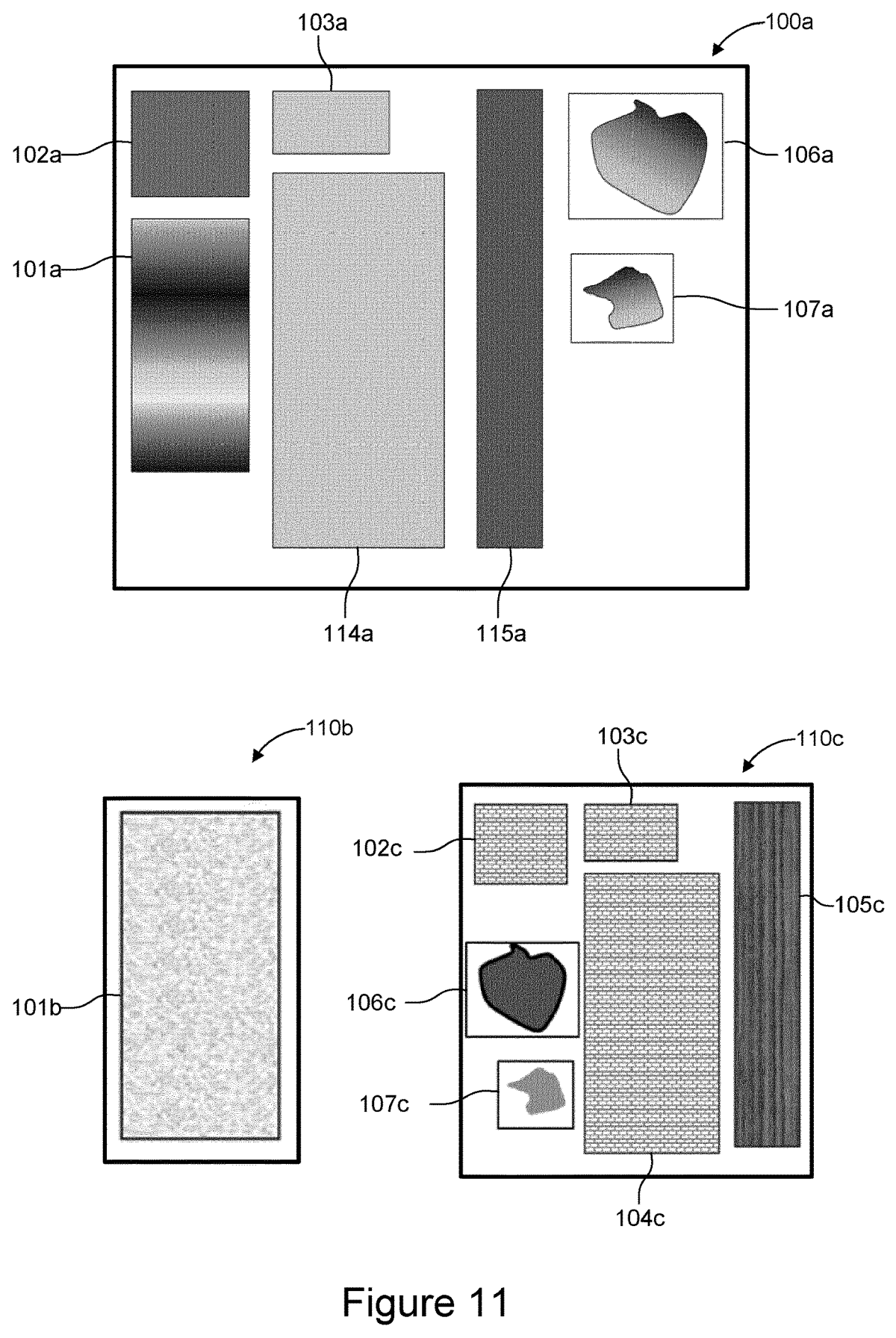

FIG. 11 shows an example encoding the 3D scene of FIG. 9 in a depth atlas 100a, a reflectance atlas 110b and a color atlas 110c according to a second embodiment of the present principles. The same depth, color and reflectance patches are obtained for parts of the 3D scene and parts out of the 3D scene reflected in at least one part of the 3D scene. In the second embodiment, depth atlas 100a is generated by packing every depth patches 101a to 107a.

A color atlas 110c is generated by packing color patches 102c to 105c corresponding to Lambertian parts of the 3D scene (i.e. non-reflecting parts) and color patches 106c and 107c corresponding to parts out of the 3D scene reflected in at least one part of the 3D scene.

A reflectance atlas 110b is generated by packing reflectance patches 101b corresponding to reflecting parts of the 3D scene (i.e. non-Lambertian parts of the 3D scene). For each reflectance patch of patch atlas 110b, BRDF information and a list of color patches which are reflected into the current patch are associated with the patch in the metadata.

In a variant, a normal atlas packing normal patches corresponding to reflecting parts of the 3D scene is associated with depth, reflectance and color atlases 100a, 110b and 110c.

Figure 12:
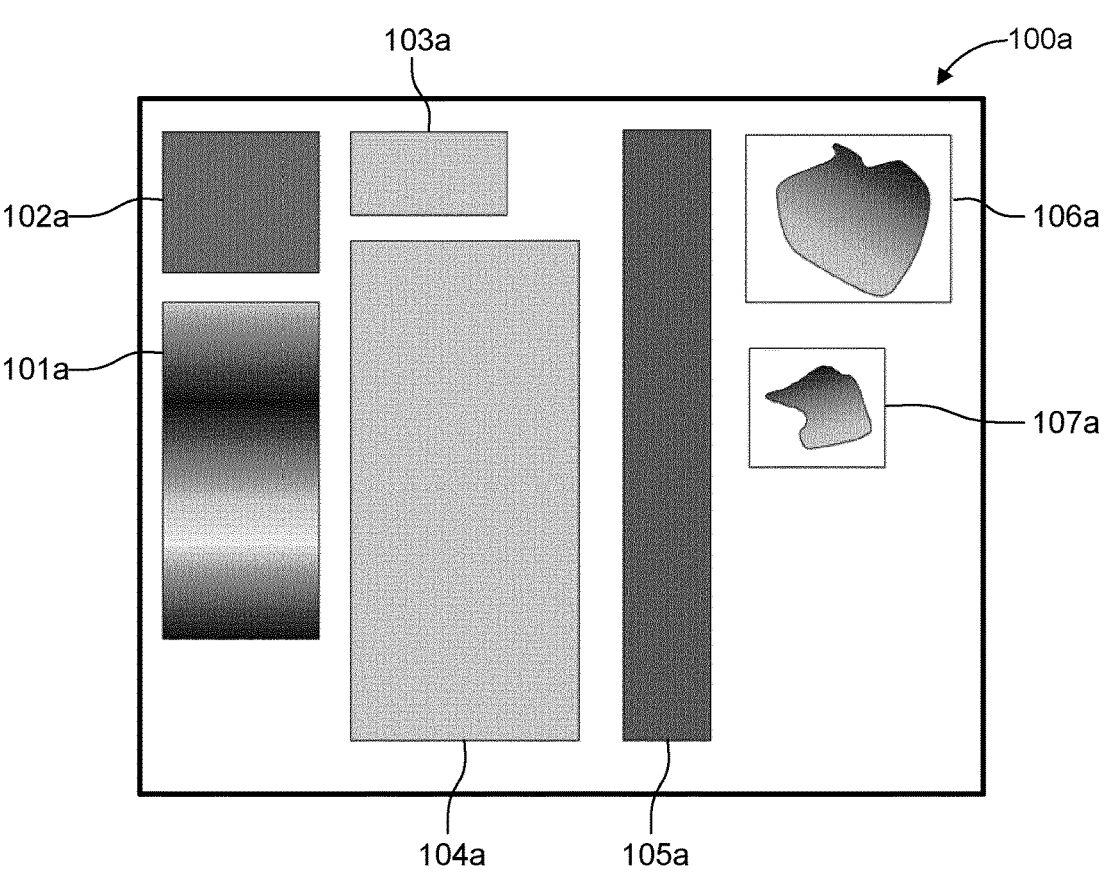
FIG. 12 shows a third example encoding the 3D scene of FIG. 9 in a depth atlas, a reflectance atlas and a color atlas according to a third embodiment of the present principles.
Figure 12:
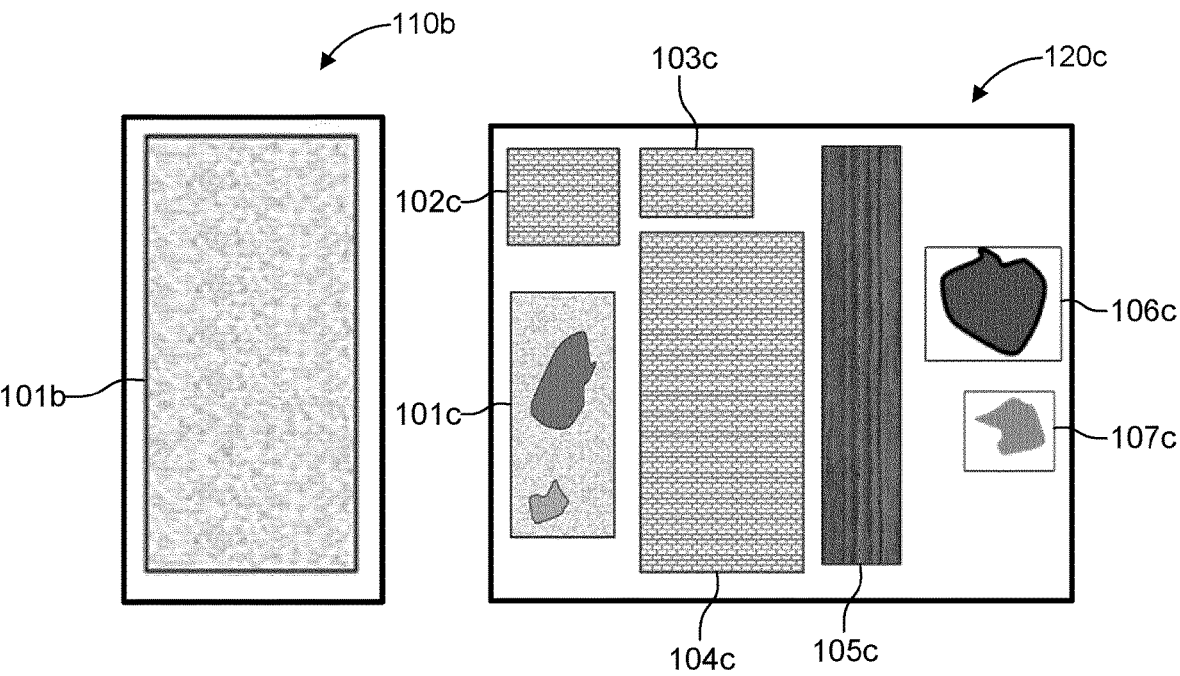

FIG. 12 shows an example encoding the 3D scene of FIG. 9 in a depth atlas 100a, a reflectance atlas 110b and a color atlas 120c according to a third embodiment of the present principles. The same depth, color and reflectance patches are obtained for parts of the 3D scene and parts out of the 3D scene reflected in at least one part of the 3D scene. In the second embodiment, depth atlas 100a is generated by packing every depth patches 101a to 107a.

A color atlas 120c is generated by packing color patches 101c to 105c corresponding to parts of the 3D scene (i.e. Lambertian and reflecting parts) and color patches 106c and 107c corresponding to parts out of the 3D scene reflected in at least one part of the 3D scene. In FIG. 12, texture patch 101c carrying the reflections as seen from a camera viewpoint is packed in the color atlas and is only useful for a retro-compatible renderer. In such a rendering mode, only the depth patches 101a to 105a and color patches 101c to 105c are decoded and fed to the renderer.

A reflectance atlas 110b is generated by packing reflectance patches 101b corresponding to reflecting parts of the 3D scene (i.e. non-Lambertian parts of the 3D scene). For each reflectance patch of patch atlas 110b, BRDF information and a list of color patches which are reflected into the current patch are associated with the patch in the metadata.

In a variant, a normal atlas packing normal patches corresponding to reflecting parts of the 3D scene is associated with depth, reflectance and color atlases 100a, 110b and 120c.

Metadata are associated with the atlases encoding a 3D scene. According to the present principles, the metadata allows separate packing (i.e. position and orientation of patches in an atlas) per attribute, and also the possibility that a patch is not always present in all attribute atlas frames. A possible syntax for the metadata may be based on the syntax of MIV standard as following.

The Atlas sequence parameter may be extended with syntax elements in bold:

| asps_miv_extension( ) { | Descriptor |
| --- | --- |
| asme_group_idx | u(v) |
| asme_auxiliary_atlas_flag | u(1) |
| if( vme_embedded_occupancy_enabled_flag ) | |
| asme_depth_occ_threshold_flag | u(1) |
| if( vme_geometry_scale_enabled_flag ) { | |
| asme_geometry_scale_factor_x_minus1 | ue(v) |

-continued

| asps_miv_extension( ) { | Descriptor |
|---|---|
| asme_geometry_scale_factor_y_minus1 | ue(v) |
| } | |
| if( !vme_embedded_occupancy_enabled_flag && vme_occupancy_scale_ enabled_flag ) { | |
| asme_occupancy_scale_factor_x_minus1 | ue(v) |
| asme_occupancy_scale_factor_y_minus1 | ue(v) |
| } | |
| asme_attribute_count | u(7) |
| for( i = 0; i <= asme_attribute_count; i++ ) { | |
| asme_attr_frame_width[ i ] | u(16) |
| asme_attr_frame_height[ i ] | u(16) |
| asme_attribute_per_patch_scale_enable[ i ] | u(1) |
| } | |
| asme_patch_attribute_offset_enabled_flag | u(1) |
| if( asme_patch_attribute_offset_enabled_flag ) | |
| asme_patch_attribute_offset_bit_depth_minus1 | ue(v) |
| } | |

The patch data unit may be extended with elements in bold:

| pdu_miv_extension( tileID, p ) { | Descriptor |
|---|---|
| if( vme_max_entity_id > 0) | |
| pdu_entity_id[ tileID ][ p ] | u(v) |
| if( asme_depth_occ_threshold_flag ) | |
| pdu_depth_occ_threshold[ tileID ][ p ] | u(v) |
| if( asme_patch_attribute_offset_enabled_flag ) | |
| for( c= 0; c < 3; c++ ) { | |
| pdu_attribute_offset[ tileID ][ p ][ c ] | u(v) |
| for( i= 0; i <= asme_attribute_count; i++ ) { | |
| pdu_attr_present_flag[ tileID ][ p ][ i ] | u(1) |
| if( pdu_attr_present_flag[ tileID ][ p ][ i ] ) { | |
| pdu_attr_2d_pos_x[ tileID ][ p ][ i ] | ue(v) |
| pdu_attr_2d_pos_y[ tileID ][ p ][ i ] | ue(v) |
| pdu_attr_orientation_index[ tileID ][ p ][ i ] | u(v) |
| if (asme_attribute_per_patch_scale_enable_flag[ i ] ) { | |
| pdu_attr_size_x_minus1[ tileID ][ p ][ i ] | uc(v) |
| pdu_attr_size_y_minus1[ tileID ][ p ][ i ] | ue(v) |
| } | |
| } | |
| } | |
| pdu_light_source_flag[ tileID ][ p ] | u(1) |
| pdu_reflection_parameters_present_flag[ tileID ][ p ] | u(1) |
| if (pdu_reflection_parameters_present_flag[ tileID ][ p ] ) { | |
| pdu_reflection_model_id[ tileID ][ p ] | u(2) |
| **if (pdu_reflection_model_id == 0 ) { /* Phong model */** | |
| pdu_specular_reflection_constant[ tileID ][ p ] | fl(16) |
| pdu_diffuse_reflection_constant[ tileID ][ p ] | fl(16) |
| pdu_ambient_reflection_constant[ tileID ][ p ] | fl(16) |
| pdu_shininess_constant[ tileID ][ p ] | fl(16) |
| } | |
| pdu_num_reflected_patches_minus1[ tileID ][ p ] | u(8) |
| for ( i = 0; i < pdu_num_reflected_patches_minus1[ tileID ][ p ] ) | |
| pdu_reflected_patch_idx[ tileID ][ p ] [ i ] | ue(v) |
| } | |
| } | |

With:

pdu_light_source_flag[tileID][p] equal to 1 indicates that the patch with index p in the tile with ID tileID is a light source external to the viewing frustum of the scene, which shall be present in the texture atlas frame and shall not be present in the reflectance atlas frame.

pdu_reflection_parameters_present_flag[tileID][p] equal to 1 indicates that reflection model parameters are present in the syntax structure for the patch with index p in the tile with ID tileID, which shall be present in the reflectance atlas frame.

pdu_reflection_model_id[tileID][p] specifies the ID of the reflection model for the patch with index p in the tile with ID tileID. pdu_reflection_model_id[tileID][p] equal to 1 indicates the Phong model.

pdu_specular_reflection_constant[tileID][p] specifies the specular reflection constant of the Phong model for the patch with index p in the tile with ID tileID.

pdu_diffuse_reflection_constant[tileID][p] specifies the diffuse reflection constant of the Phong model for the patch with index p in the tile with ID tileID.

pdu_ambient_reflection_constant[tileID][p] specifies the ambient reflection constant of the Phong model for the patch with index p in the tile with ID tileID.

pdu_diffuse_reflection_constant[tileID][p] specifies the shininess constant of the Phong model for the patch with index p in the tile with ID tileID.

pdu_num_reflected_patches_minus1[tileID][p] plus 1 specifies the number of texture patches which are reflected in the patch with index p in the tile with ID tileID.

pdu_reflected_patch_idx[tileID][p] [i] specifies the index in the texture atlas frame of the i-th texture patch reflected in the patch with index p in the tile with ID tileID.

Alternatively, the patch reflection properties can be mutualized into a set of "material reflection properties" (e.g. "metal", "wood", "grass" etc.) and the pdu_entity_id[tileID] [p] syntax element can be used to associate each non-Lambertian patch with one material ID. In that case the syntax elements related to the reflection model parameters are provided through external means to the renderer (for each of the registered materials) and only the list of reflected patches is signalled into the patch data unit MIV extension.

The common atlas sequence parameter set of MIV may be extended as following:

| casps_miv_extension( ) { | Descriptor |
| --- | --- |
| casme_omaf_v1_compatible_flag | u(1) |
| casme_miv_v1_rendering_compatible_flag | u(1) |
| casme_depth_quantization_params_present_flag | u(1) |
| casme_vui_params_present_flag | u(1) |
| if( casme_vui_params_present_flag ) | |
| vui_parameters( ) | |
| } | |

With casme_miv_v1_rendering_compatible_flag specifies that the atlas geometry and texture frames are compatible for rendering with the hypothetical rendering process of ISO/IEC 23090-12 (1E). When casme_MIV_v1_rendering_compatible_flag is equal to 1, it is a requirement of bitstream conformance that at least one sub-set of patches in the geometry and texture frames of the atlases are compatible for rendering with the hypothetical rendering process of ISO/IEC 23090-12 (1E). When not present the value of casme_MIV_v1_rendering_compatible_flag is inferred to be equal to 0.

FIG. 13 illustrates a method 130 for encoding a 3D scene with complex light effects. At a step 131, first depth patches, first color patches and reflectance patches are obtained by projecting parts of the captured 3D scene. Second depth patches and second color patches are also obtained by projecting parts out of the captured 3D scene reflected in at least one part of the 3D scene. At a step 132, a depth atlas is generated by packing first and second depth patches and a color atlas is generated by packing the second color patches and a subset of the first color patches. According to a first embodiment, the subset of the first color patches packed in the color atlas is empty. In a second embodiment, the subset of the first color patches packed in the color atlas corresponds to Lambertian parts of the 3D scene. In a third embodiment, the subset of the first color patches packed in the color atlas comprises every first color patch. At a step 133, a reflectance atlas is generated by packing a subset of the reflectance patches. In the first embodiment, the subset of the reflectance patches packed in the reflectance atlas comprises every reflectance patch. In the second embodiment, the subset of the reflectance patches packed in the reflectance atlas corresponds to non-diffuse reflecting parts of the 3D scene. In the third embodiment, the subset of the reflectance patches packed in the reflectance atlas corresponds to non-diffuse reflecting parts of the 3D scene. In every embodiment, the reflectance atlas is associated with metadata comprising, for each reflectance patch packed in the reflectance atlas, first information encoding parameters of a Bidirectional Reflectance Distribution Function model of the light reflection on the reflectance patch, and second information indicating a list of color patches reflected into the reflectance patch. At an optional step 134, a normal atlas is generated by packing normal patches corresponding to the subset of the reflectance patches in the reflectance atlas. At a step 135, generated atlases and associated metadata are encoded in a data stream.

FIG. 14 illustrates a method 140 for rendering a 3D scene with complex light effects. At a step 141, a data stream carrying data representative of the 3D scene is obtained. At a step 142, a depth atlas packing depth patches and a color atlas packing color patches is decoded from the data stream. At a step 143, a reflectance atlas packing reflectance patches is decoded from the data stream. Metadata associated with the reflectance atlas are also decoded. The metadata comprise, for each reflectance patch packed in the reflectance atlas, first information encoding parameters of a Bidirectional Reflectance Distribution Function model of the light reflection on the reflectance patch, and second information indicating a list of color patches reflected into the reflectance patch. In an optional step 144, a normal atlas packing normal patches corresponding to the subset of the reflectance patches in the reflectance atlas is decoded from the data stream.

At a step 145, pixels of the color patches are un-projected according to pixels of corresponding depth patches to retrieve points of the 3D scene. At a step 146, light effects are retrieved by using a ray tracing method based on pixels of reflectance patches and associated metadata, and depth and color patches listed in metadata. In a variant, the normal patches may be used to facilitate the ray tracing.

The implementations described herein may be implemented in, for example, a method or a process, an apparatus, a computer program product, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, Smartphones, tablets, computers, mobile phones, portable/personal digital assistants ("PDAs"), and other devices that facilitate communication of information between end-users.

Implementations of the various processes and features described herein may be embodied in a variety of different equipment or applications, particularly, for example, equipment or applications associated with data encoding, data decoding, view generation, texture processing, and other processing of images and related texture information and/or depth information. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method comprising:
for parts of a three-dimensional (3D) scene, obtaining first color patches and reflectance patches;
for parts out of the 3D scene reflected in at least one part of the 3D scene, obtaining second color patches;
generating a color atlas by packing the second color patches and a subset of the first color patches;
generating a reflectance atlas by packing a subset of the reflectance patches;
for each reflectance patch packed in the reflectance atlas, generating first information encoding parameters of a bidirectional reflectance distribution function model of a light reflection on the reflectance patch, and
generating second information indicating a list of color patches reflected into the reflectance patch; and
encoding the color atlas, the reflectance atlas and the first information and the second information in a data stream.

2. The method of claim 1, wherein:
the subset of the first color patches packed in the color atlas is empty; and
the subset of the reflectance patches packed in the reflectance atlas comprises every reflectance patch.

3. The method of claim 1, wherein:
the subset of the first color patches packed in the color atlas corresponds to Lambertian parts of the 3D scene; and
the subset of the reflectance patches packed in the reflectance atlas corresponds to non-diffuse reflecting parts of the 3D scene.

4. The method of claim 1, wherein:
the subset of the first color patches packed in the color atlas comprises every first color patch; and
the subset of the reflectance patches packed in the reflectance atlas corresponds to non-diffuse reflecting parts of the 3D scene.

5. The method of claim 1, wherein the bidirectional reflectance distribution function model is a Phong model.

6. The method of claim 1, further comprising generating a surface normal atlas by packing surface normal patches corresponding to the subset of the reflectance patches in the reflectance atlas.

7. The method of claim 1, further comprising:
for parts of the 3D scene, obtaining first depth patches;
for parts out of the 3D scene, obtaining second depth patches;
generating a depth atlas by packing first and second depth patches; and
encoding the depth atlas in the data stream.

8. A device comprising:
a processor configured to:
for parts of a three-dimensional (3D) scene, obtain first color patches and reflectance patches;
for parts out of the 3D scene reflected in at least one part of the 3D scene, obtain second color patches;
generate a color atlas by packing the second color patches and a subset of the first color patches;
generate a reflectance atlas by packing a subset of the reflectance patches;
for each reflectance patch packed in the reflectance atlas,
generate first information encoding parameters of a bidirectional reflectance distribution function model of a light reflection on the reflectance patch, and
generate second information indicating a list of color patches reflected into the reflectance patch; and
encode the color atlas, the reflectance atlas, the first information and the second information in a data stream.

9. The device of claim 8, wherein:
the subset of the first color patches packed in the color atlas is empty; and
the subset of the reflectance patches packed in the reflectance atlas comprises every reflectance patch.

10. The device of claim 8, wherein:

the subset of the first color patches packed in the color atlas corresponds to Lambertian parts of the 3D scene; and the subset of the reflectance patches packed in the reflectance atlas corresponds to non-diffuse reflecting parts of the 3D scene.

11. The device of claim 8, wherein:

the subset of the first color patches packed in the color atlas comprises every first color patch; and the subset of the reflectance patches packed in the reflectance atlas corresponds to non-diffuse reflecting parts of the 3D scene.

12. The device of claim 8, wherein the bidirectional reflectance distribution function model is a Phong model.

13. The device of claim 8, wherein the processor is further configured to generate a surface normal atlas by packing surface normal patches corresponding to the subset of the reflectance patches in the reflectance atlas.

14. The device of claim 8, wherein the processor is further configured to:

for parts of the 3D scene, obtain first depth patches;

for parts out of the 3D scene, obtain second depth patches;

generate a depth atlas by packing first and second depth patches; and encode the depth atlas in the data stream.

15. A method of rendering a 3D scene, the method comprising:

decoding from a data stream:

a color atlas packing first color patches corresponding to parts of the 3D scene and second color patches corresponding to parts out of the 3D scene reflected in at least one part of the 3D scene;

a reflectance atlas packing reflectance patches corresponding to parts of the 3D scene;

information signaling a rendering mode determined according to the first color patches and the reflectance patches; and for each reflectance patch packed in the reflectance atlas, first information encoding parameters of a bidirectional reflectance distribution function model of a light reflection on the reflectance patch, and second information indicating a list of color patches reflected into the reflectance patch;

and rendering the 3D scene by un-projecting the first and second color patches using ray tracing for reflectance patches according to first and second information and associated color patches.

16. The method of claim 15, wherein the bidirectional reflectance distribution function model is a Phong model.

17. The method of claim 15, further comprising decoding, from the data stream, a surface normal atlas packing surface normal patches corresponding to a subset of the reflectance patches in the reflectance atlas and using surface normal patches for ray tracing.

18. The method of claim 15, further comprising:

decoding, from the data stream, a depth atlas packing first depth patches corresponding to parts of a 3D scene and second depth patches corresponding to parts out of the 3D scene reflected in at least one part of the 3D scene; and rendering the 3D scene by un-projecting the first and second color patches according to the first and second depth patches.

19. A device comprising:

a processor configured to:

decode from a data stream:

a color atlas packing first color patches corresponding to parts of a three-dimensional (3D) scene and second color patches corresponding to parts out of the 3D scene reflected in at least one part of the 3D scene;

a reflectance atlas packing reflectance patches corresponding to parts of the 3D scene;

information signaling a rendering mode determined according to the first color patches and the reflectance patches; and for each reflectance patch packed in the reflectance atlas, first information encoding parameters of a bidirectional reflectance distribution function model of a light reflection on the reflectance patch, and second information indicating a list of color patches reflected into the reflectance patch;

and render the 3D scene by un-projecting the first and second color patches by using ray tracing for reflectance patches according to first and second information and associated color patches.

20. The device of claim 19, wherein the bidirectional reflectance distribution function model is a Phong model.

21. The device of claim 19, wherein the processor is further configured to decode, from the data stream, a surface normal atlas packing surface normal patches corresponding to a subset of the reflectance patches in the reflectance atlas and to use surface normal patches for ray tracing.

22. The device of claim 19, wherein the processor is further configured to:

decode, from the data stream, a depth atlas packing first depth patches corresponding to parts of a 3D scene and second depth patches corresponding to parts out of the 3D scene reflected in at least one part of the 3D scene; and render the 3D scene by un-projecting the first and second color patches according to the first and second depth patches.

* * * * *